United States Patent
Song

(10) Patent No.: US 10,877,455 B2
(45) Date of Patent: Dec. 29, 2020

(54) METHOD AND APPARATUS FOR MONITORING AND RECONSTRUCTING A SOFTWARE-DEFINED PLC

(71) Applicant: KYLAND TECHNOLOGY CO., LTD., Beijing (CN)

(72) Inventor: Jianwei Song, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 105 days.

(21) Appl. No.: 16/222,307

(22) Filed: Dec. 17, 2018

(65) Prior Publication Data

US 2019/0196435 A1 Jun. 27, 2019

(30) Foreign Application Priority Data

Dec. 22, 2017 (CN) .......................... 2017 1 1407327
Nov. 2, 2018 (CN) .......................... 2018 1 1298670

(51) Int. Cl.
*G06F 11/20* (2006.01)
*G05B 19/05* (2006.01)
(Continued)

(52) U.S. Cl.
CPC .......... *G05B 19/058* (2013.01); *G06F 11/203* (2013.01); *G06F 11/2035* (2013.01);
(Continued)

(58) Field of Classification Search
CPC ............. G06F 11/1484; G06F 11/1451; G06F 11/1471; G06F 11/1438; G06F 11/1448;
(Continued)

(56) References Cited

U.S. PATENT DOCUMENTS 5,316,707 A 5/1994 Stanciu et al.
7,032,029 B1 * 4/2006 Tanzman ................. G05B 9/03
700/82

(Continued)

FOREIGN PATENT DOCUMENTS

CN 101788803 A 7/2010
CN 107122229 A 9/2017
(Continued)

OTHER PUBLICATIONS

Tao-tao et al. "Implementation of compatible PMW file for virtual PLC simulation system" School of Mechanical and Electrical Engineering, Guangdong University of Technology, Guangzhou 510006, China.
(Continued)

*Primary Examiner* — Nadeem Iqbal
(74) *Attorney, Agent, or Firm* — Arent Fox LLP; Michael Fainberg

(57) ABSTRACT

Method and apparatus for monitoring and reconstructing a software-defined PLC are provided. The method includes: upon monitoring a PLC fails, obtaining, by a soft guardian, an operating state of each physical core on each server in a server cluster, and an operating state of each micro kernel on the each physical core; determining a target micro kernel according to the operating state of each physical core on each server, and the operating state of each micro kernel on each physical core; and transmitting a reconstruction instruction to the target micro kernel to instruct the virtual PLC to be reconstructed on the target micro kernel.

18 Claims, 10 Drawing Sheets

(51) Int. Cl.
*G06F 11/30* (2006.01)
*G06F 9/455* (2018.01)

(52) U.S. Cl.
CPC .. *G06F 11/301* (2013.01); *G05B 2219/14006* (2013.01); *G06F 9/45533* (2013.01); *G06F 2009/45575* (2013.01)

(58) Field of Classification Search
CPC ............. G06F 11/2023; G06F 11/2033; G06F 11/2048
See application file for complete search history.

(56) References Cited

U.S. PATENT DOCUMENTS

| | | | |
|---|---|---|---|
| 7,797,572 B2* | 9/2010 | Kawashima | G06F 11/2023 714/5.11 |
| 2003/0033030 A1 | 2/2003 | Niasmith et al. | |
| 2007/0180314 A1* | 8/2007 | Kawashima | G06F 11/3433 714/15 |
| 2008/0208361 A1 | 8/2008 | Grgic | |
| 2010/0128598 A1* | 5/2010 | Gandhewar | H04L 67/1002 370/217 |
| 2011/0179307 A1* | 7/2011 | Baba | G06F 11/2043 714/23 |
| 2012/0011397 A1* | 1/2012 | Murakami | G06F 11/0793 714/15 |
| 2014/0019613 A1* | 1/2014 | Ishikawa | G06F 11/3442 709/224 |
| 2015/0309896 A1* | 10/2015 | Wu | G06F 11/203 714/4.11 |

FOREIGN PATENT DOCUMENTS

| | | |
|---|---|---|
| JP | 2003036101 A | 2/2003 |
| JP | 2010503115 A | 1/2010 |
| JP | 2016509328 A | 3/2016 |

OTHER PUBLICATIONS

Design and Implementation of Virtual Machine System in Embedded SoftPLC System, 2013 International Conference on Computer Sciences and Applications, IEEE Computer Society 2013, pp. 775-778.

Obata Seiki, "Effective method of adapting soft PLC to field needs", Instrumentation Control Engineering(2012 vol. 55 No. 12).

* cited by examiner

METHOD AND APPARATUS FOR MONITORING AND RECONSTRUCTING A SOFTWARE-DEFINED PLC

This application claims priority to Chinese Patent Application No. 201711407327.0, filed with the Chinese Patent Office on Dec. 22, 2017, and Chinese Patent Application No. 201811298670.0 filed with the Chinese Patent Office on Nov. 2, 2018, both of which are hereby incorporated by reference in their entireties.

FIELD

Embodiments of the present disclosure relate to the field of Programmable Logic Controllers (PLCs), and particularly to a method and apparatus for monitoring and reconstructing a software-defined PLC.

BACKGROUND

As the computer technologies, the signal processing technologies, and the control networks are advancing constantly and the user requirements are higher and higher, the Programmable Logic Controller (PLC) has been widely applied, for example, in the respective fields of steels, oils, chemical engineering, electric power, mechanical manufacturing, express deliveries, cultures and entrainments, etc., and particularly in a distributed control system.

In the prior art, the PLC-based distributed control system includes a plurality of hard PLCs. Typically there are a large number of devices to be controlled in the distributed control system, and they are distributed in a large area, and the devices to be controlled may be correlated with each other, so the hard PLCs in the distributed control system shall be able to control the devices to be controlled in real time. When some hard PLC in the distributed control system fails and can not to control the devices to be controlled in real time, thus hindering the entire distributed control system from operating normally. Therefore the distributed control system is typically configured with a corresponding disaster tolerance mode.

At present in the disaster tolerance mode of the distributed control system including a large number of hard PLCs, each standalone hard PLC is configured with one or more redundant hard PLCs. When the hard PLC fails, the system is switched to one of the redundant hard PLCs. However if all of a plurality of hard PLCs in some area, and their redundant PLCs fail, then since the hard PLCs in another area operate normally, and the PLCs in the two areas affect each other, the distributed control system has to be stopped at this time from operating to replace hard PLCs in the failing area.

SUMMARY

Embodiments of the disclosure provide a method and apparatus for monitoring and reconstructing a software-defined PLC so as to reconstruct a virtual PLC rapidly without being powered off.

An embodiment of the disclosure provides a method for monitoring and reconstructing a software-defined PLC, wherein the method is applicable to a server cluster, each of a plurality of servers in the server cluster includes at least one physical core on which at least two micro kernels are deployed, the server cluster includes one or more soft guardians, and a virtual PLC or the soft guardian is deployed on the micro kernel. The method includes: upon monitoring that the virtual PLC fails, obtaining, by the soft guardian, an operating state of each physical core on each server in the server cluster, and an operating state of each micro kernel on the each physical core; determining, by the soft guardian, a target micro kernel according to the operating state of the each physical core on the each server, and the operating state of the each micro kernel on the each physical core; and transmitting, by the soft guardian, a reconstruction instruction to the target micro kernel, wherein the reconstruction instruction is configured to instruct the virtual PLC to be reconstructed on the target micro kernel.

With this solution, a plurality of micro kernels are virtualized on a physical core, and a virtual PLC operates on each micro kernel (virtual operating system). If the virtual PLC fails, then the PLC may be reconstructed on another micro kernel, and since the plurality of micro kernels are independent of each other, the virtual PLC can be reconstructed without powering off a server and reconnecting the server, so that the virtual PLC can be reconstructed without powering off the server, so as not to hinder the other PLCs in the system from operating.

Furthermore virtualized real-time operating systems are deployed on the physical core(s) of each of the plurality of servers in the server cluster, and virtual PLCs are deployed on the virtualized real-time operating systems, so that the respective PLCs can control devices to be controlled, in a more real-time manner, and the entire system can be made more real-time because the soft guardians are deployed on the virtualized real-time operating systems.

Optionally the soft guardian obtains configuration information, wherein the configuration information includes one or more specified virtual PLCs to be monitored by the soft guardian, and the specified virtual PLCs to be monitored by the soft guardian are located on a same physical core as the soft guardian, or the specified virtual PLCs to be monitored by the soft guardian are not located on the same physical core as the soft guardian; and the soft guardian monitors operating states of the one or more specified virtual PLCs according to the configuration information.

Optionally obtaining, by the soft guardian, configuration information, wherein the configuration information includes one or more specified virtual PLCs to be monitored by the soft guardian, and a user program compiled result file of each of the specified virtual PLCs; and the soft guardian can transmit to the target micro kernel the reconstruction instruction including the program compiled result file of the specified virtual PLC which is monitored to fail, wherein the reconstruction instruction is configured to instruct the target micro kernel to reconstruct the specified virtual PLC, which is monitored to fail, according to the user program compiled result file of the specified virtual PLC. In this way, instead of compiling user program again, any one of sets of instructions in the user program can be read and executed directly to reconstruct the virtual PLC, so that the virtual PLC can be reconstructed rapidly as compared with the prior art in which PLCs are backed up redundantly. Furthermore the server can reconstruct the virtual PLC without being powered off, so as not to hinder normal virtual PLCs in the entire distributed control system from operating normally.

In the embodiment of the disclosure, the target micro kernel can be determined in the following two implementations.

In a first implementation, the operating state of the each physical core includes first load information of the each physical core, and the operating state of the each micro kernel includes second load information of the each micro kernel; the soft guardian obtains the first load information of the each physical core on the each server, and the second load information of the each micro kernel on the each physical core; and the soft guardian determines the target micro kernel according to the first load information of the each physical core on the each server, and the second load information of the each micro kernel on the each physical core.

In a second implementation, the soft guardian obtains configuration information, wherein the configuration information includes one or more specified virtual PLCs to be monitored by the soft guardian, and a deployment strategy to be applied when the specified virtual PLC fails, and the deployment strategy to be applied when the specified virtual PLC fails indicates priorities of physical cores for reconstructing, and priorities of micro kernels on each physical core for reconstructing, after the specified virtual PLC fails; and the soft guardian can determine the target micro kernel according to the first load information of the each physical core on the each server, the second load information of the each micro kernel on the each physical core, and the deployment strategy to be applied when the specified virtual PLC.

An embodiment of the disclosure provides a method for monitoring and reconstructing a software-defined PLC, wherein the method is applicable to a server cluster, each of a plurality of servers in the server cluster include at least one physical core on which at least two micro kernels are deployed, the server cluster includes one or more soft guardians, and a virtual PLC or the soft guardian is deployed on the micro kernel, The method includes: receiving, by a server, a reconstruction instruction from the soft guardian, wherein the reconstruction instruction includes a user program compiled result file of a specified virtual PLC monitored by the soft guardian, and a target micro kernel on which the specified virtual PLC is to be reconstructed; and reconstructing, by the server, the specified virtual PLC on the target micro kernel according to the user program compiled result file of the specified virtual PLC.

Optionally reconstructing, by the server, the specified virtual PLC on the target micro kernel according to the reconstruction instruction, and the user program compiled result file of the specified virtual PLC includes: starting system program of the virtual PLC preinstalled on the target micro kernel, and executing the user program compiled result file of the specified virtual PLC on the system program of the virtual PLC.

Optionally before the server receives the reconstruction instruction from the soft guardian, the method further includes: receiving, by the server, an initialization deployment instruction from a client, wherein configuration information in the initialization deployment instruction is configured to deploy a soft guardian on a specified micro kernel on a specified physical core, and to deploy a virtual PLC on a specified micro kernel on a specified physical core, and to make the soft guardian monitor one or more specified virtual PLCs, wherein the specified virtual PLCs monitored by the soft guardian are located on a same physical core as the soft guardian, or the specified PLCs monitored by the soft guardian are not located on the same physical core as the soft guardian; and deploying, by the server, the virtual PLC and the soft guardian according to configuration information in the initialization deployment instruction.

An embodiment of the disclosure provides a server, wherein the server is applicable to a server cluster, each of a plurality of servers in the server cluster include at least one physical core on which at least two micro kernels are deployed, the server cluster includes one or more soft guardians, and a virtual PLC or the soft guardian is deployed on the micro kernel; and the soft guardian deployed on the server includes: an obtaining unit configured, upon monitoring that the virtual PLC fails, to obtain an operating state of each physical core on each server in the server cluster, and an operating state of each micro kernel on the each physical core; a processing unit configured to determine a target micro kernel according to the operating state of the each physical core on the each server, and the operating state of the each micro kernel on the each physical core; and a transmitting unit configured to transmit a reconstruction instruction to the target micro kernel, wherein the reconstruction instruction is configured to instruct the virtual PLC to be reconstructed on the target micro kernel.

Optionally the obtaining unit is further configured: to obtain configuration information, wherein the configuration information includes one or more specified virtual PLCs to be monitored by the soft guardian, and the specified virtual PLCs to be monitored by the soft guardian are located on a same physical core as the soft guardian, or the specified virtual PLCs to be monitored by the soft guardian are not located on the same physical core as the soft guardian; and the processing unit is further configured: to monitor operating states of the one or more specified virtual PLCs according to the configuration information.

Optionally the obtaining unit is further configured: to obtain configuration information, wherein the configuration information includes one or more specified virtual PLCs to be monitored by the soft guardian, and a user program compiled result file of each of the one or more specified virtual PLCs; and the transmitting unit is configured: to transmit to the target micro kernel the reconstruction instruction including the program compiled result file of the specified virtual PLC which is monitored to fail, wherein the reconstruction instruction is configured to instruct to the target micro kernel to reconstruct the specified virtual PLC, which is monitored to fail, according to the user program compiled result file of the specified virtual PLC.

Optionally the operating state of the each physical core includes first load information of the each physical core, and the operating state of the each micro kernel includes second load information of the each micro kernel; the obtaining unit is configured: to obtain the first load information of the each physical core on the each server, and the second load information of the each micro kernel on the each physical core; and the processing unit is configured: to determine the target micro kernel according to the first load information of the each physical core on the each server, and the second load information of the each micro kernel on the each physical core.

An embodiment of the disclosure provides a server, wherein the server is applicable to a server cluster, each of a plurality of servers in the server cluster includes at least one physical core on which at least two micro kernels are deployed, the server cluster includes one or more soft guardians, and a virtual PLC or the soft guardian is deployed on the micro kernel. The server includes: a receiving unit configured to receive a reconstruction instruction from the soft guardian, wherein the reconstruction instruction includes a user program compiled result file of a specified virtual PLC monitored by the soft guardian, and a target micro kernel on which the specified virtual PLC is to be reconstructed; and a processing unit configured to reconstruct the specified virtual PLC on the target micro kernel according to the user program compiled result file of the specified virtual PLC.

Optionally the processing unit is configured: to start system program of the virtual PLC preinstalled on the target micro kernel, and to execute the user program compiled result file of the specified virtual PLC on the system program of the virtual PLC.

Optionally the receiving unit is further configured: to receive an initialization deployment instruction from a client, wherein configuration information in the initialization deployment instruction is configured to deploy a soft guardian on a specified micro kernel on a specified physical core, and deploys a virtual PLC on a specified micro kernel on a specified physical core, and to make the soft guardian monitor one or more specified virtual PLCs, wherein the specified virtual PLCs monitored by the soft guardian are located on a same physical core as the soft guardian, or the specified PLCs monitored by the soft guardian are not located on the same physical core as the soft guardian; and the processing unit is further configured: to deploy the virtual PLC and the soft guardian according to configuration information in the initialization deployment instruction.

An embodiment of the disclosure provides a method for disaster tolerance in a PLC-based distributed control system, wherein the method is applicable to a server cluster deployed with virtualized operating systems, and one or more soft Programmable Logic Controllers (PLCs), real-time operating systems of the virtual PLC(s), soft guardian(s), and real-time operating system(s) of the soft guardian(s) are deployed on each server in the server cluster. The method includes: obtaining, by a soft guardian, an operating state of each server in the server cluster upon determining that a virtual PLC fails; determining, by the soft guardian, a target server according to the operating state of the each server; and transmitting, by the soft guardian, a deployment instruction to the target server, wherein the deployment instruction is configured to instruct the target server to deploy the virtual PLC.

In the embodiment of the disclosure, virtual PLCs, and real-time operating systems of the virtual PLCs are deployed on the each server in the server cluster, so each virtual PLC can control devices to be controlled, in a more real-time manner using the real-time operating system of the virtual PLC, and the entire distributed control system can be made more real-time using the real-time operating systems of the soft guardian.

Furthermore the soft guardian obtains the operating state of each server in the server cluster upon determining that the virtual PLC fails; determines the target server according to the operating state of the each server; and transmits the deployment instruction to the determined target server so that the virtual PLC is redeployed automatically on the target server without hindering the entire distributed control system from operating normally; and in this way, the disaster tolerance of the distributed control system can be improved, and the distributed control system can be maintained easily.

Optionally before the soft guardian determines that the virtual PLC fails, the method further includes: obtaining, by the soft guardian, virtual PLC topology information, wherein the virtual PLC topology information includes a mapping relationship between soft guardians and virtual PLCs; and monitoring, by the soft guardian, operating states of one or more virtual PLCs according to the mapping relationship.

Optionally transmitting, by the soft guardian, the deployment instruction to the target server includes: determining, by the soft guardian, a set of instructions of the virtual PLC, wherein the set of instructions of the virtual PLC includes a first set of event-driven instructions, and a second set of periodically-polled and event-driven instructions; and transmitting, by the soft guardian, the deployment instruction including the set of instructions of the virtual PLC to the target server.

Optionally after the soft guardian transmits the deployment instruction to the target server, the method further includes: updating, by the soft guardian, the virtual PLC topology information.

Optionally the method for disaster tolerance in a PLC-based distributed control system further includes: monitoring, by the soft guardian, the operating state of the each server; and transmitting, by the soft guardian, an alarm upon determining that there is a server in an abnormal state.

An embodiment of the disclosure provides an apparatus for disaster tolerance in a PLC-based distributed control system, wherein the apparatus is applicable to a server cluster deployed with a virtualized operating system, and one or more virtual Programmable Logic Controllers (PLCs), real-time operating systems of the virtual PLC(s), soft guardian(s), and real-time operating system(s) of the soft guardian(s) are deployed on each server in the server cluster; and each soft guardian includes: an obtaining unit configured to obtain an operating state of each server in the server cluster upon determining that a virtual PLC fails; a determining unit is configured to determine a target server according to the operating state of the each server; and a transmitting unit configured to transmit a deployment instruction to the target server, wherein the deployment instruction is configured to instruct the target server to deploy the virtual PLC.

Optionally the obtaining unit is further configured to obtain virtual PLC topology information, wherein the virtual PLC topology information includes a mapping relationship between the soft guardians and the virtual PLCs; and the apparatus further includes a monitoring unit configured to monitor operating states of one or more virtual PLCs according to the mapping relationship.

Optionally the determining unit is configured: to determine a set of instructions of the virtual PLC, wherein the set of instructions of the virtual PLC includes a first set of event-driven instructions, and a second set of periodically-polled and event-driven instructions; and the transmitting unit is configured to transmit the deployment instruction including the set of instructions of the virtual PLC to the target server.

Optionally the apparatus further includes an updating unit configured to update the virtual PLC topology information.

Optionally the monitoring unit is further configured: to monitor the operating state of the each server; and the transmitting unit is configured to transmit an alarm upon determining that there is a server in an abnormal state.

An embodiment of the disclosure provides a computer readable storage medium on which computer executable instructions are stored, wherein the computer executable instructions are configured to be executed on a computer to cause the computer to perform the method according to any one of the embodiments of the disclosure.

An embodiment of the disclosure provides a computer device including: a memory configured to store program instructions; and a processor configured to invoke the program instructions stored in the memory, and to perform the method according to any one of the embodiments of the disclosure according to the program instructions.

BRIEF DESCRIPTION OF THE DRAWINGS

In order to make the technical solutions according to the embodiments of the disclosure more apparent, the drawings to which reference is to be made in the description of the embodiments will be introduced below in brief, and apparently the drawings to be described below illustrate only some embodiments of the disclosure, and based upon the drawings here, other drawings will occur to those ordinarily skilled in the art without any inventive effort.

DETAILED DESCRIPTION

In order to make the objects, technical solutions, and advantages of the embodiments of the disclosure more apparent, the disclosure will be described below in further details with reference to the drawings, and apparently the embodiments described below are only a part but not all of the embodiments of the disclosure. Based upon the embodiments here of the disclosure, all the other embodiments which can occur to those ordinarily skilled in the art without any inventive effort shall fall into the scope of the disclosure.

First Embodiment

Figure 1:
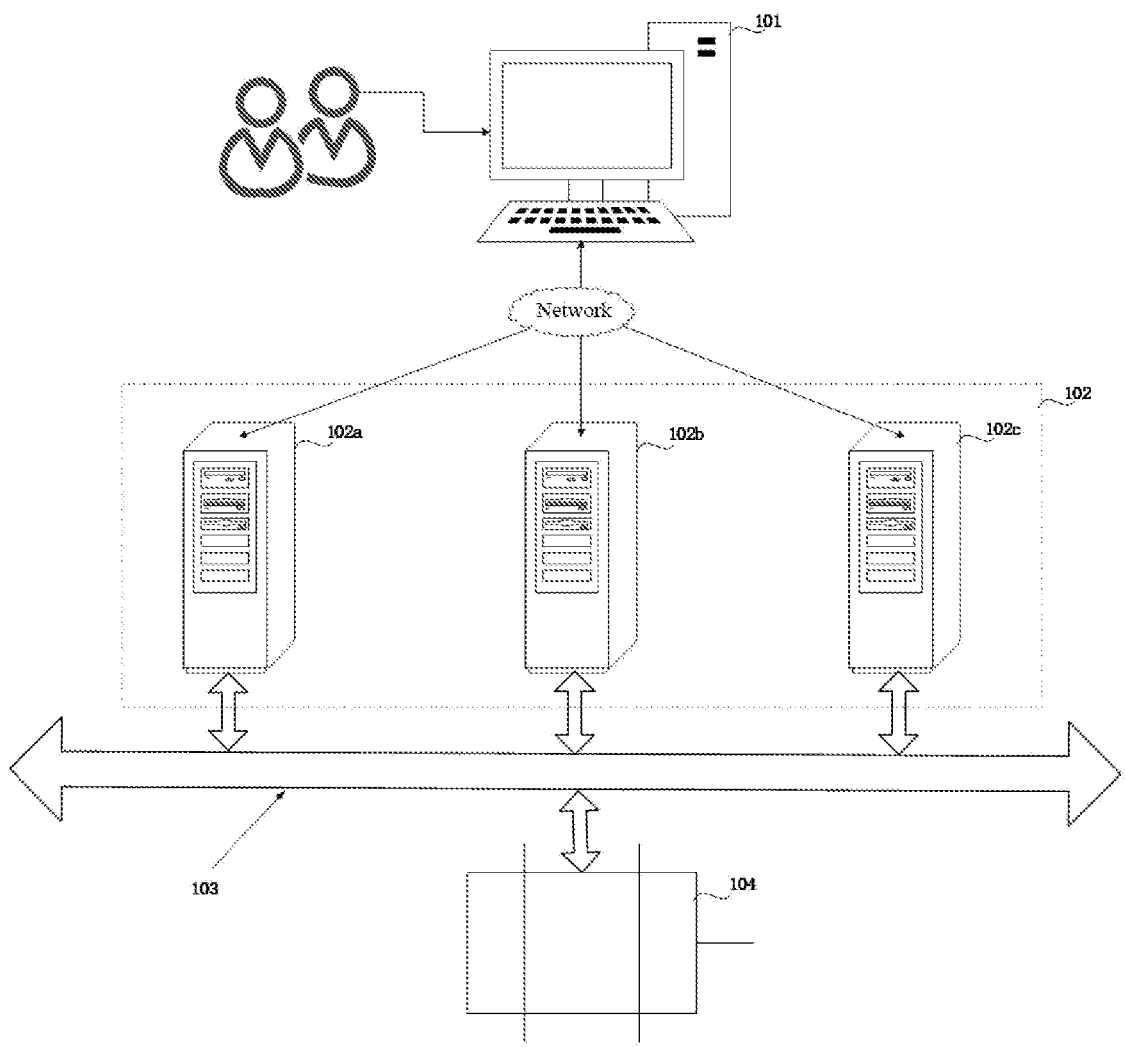
FIG. 1 is a schematic architectural diagram of a PLC-based distributed control system according to an embodiment of the disclosure.

FIG. 1 illustrates a schematic architectural diagram of a distributed disaster tolerance apparatus according to embodiment of the disclosure. As illustrated in FIG. 1, the system architecture can include a client 101, a server cluster 102, an Input/Output (I/O) bus 103, and at least one device 104 to be controlled. FIG. 1 illustrates the server cluster including a server 102a, a server 102b, and a server 102c by way of an example. The client 101 is connected with the respective servers in the server cluster 102 in a wired or wireless manner; the server 102a, the server 102b, and the server 102c are connected with each other in a wired or wireless manner; and the server 102a, the server 102b, and the server 102c are connected respectively with the device 104 to be controlled through the I/O bus 103.

Application development environment software, e.g., Integrated Development Environment (IDE) software, is deployed on the client 101, where the development environment software includes an editor, a compiler. The development environment software supports the International Electrotechnical Commission (IEC) 61131 standard and the IEC 61499 standard. In the development environment, a user programs in the editor using a Structured Text (ST) language editor, an Intermediate Language (IL) language editor, a Function Block Diagram (FBD) language editor, a Sequential Function Chart (SFC) language editor, a LadderLogic Programming Language (LAD) language editor, etc., in the IEC 61131 standard; and programs function block diagram and execution control chart using a function block diagram editor in the IEC 61499 standard, an Execution Control Chart (ECC) chart editor in the IEC 61499, a cross-editor. In the embodiment of the disclosure, when the client programs in the editor, the client deploys soft PLCs and soft guardians according to both the IEC 61499 standard and the IEC 61131 standard, and since a control logic of single soft PLC, and a communication protocol and a communication strategy between the single soft PLC are specified in the IEC 61131 standard, the IEC 61131 standard is supplemented with the IEC 61499 standard in order to provide a control logic on the entire PLC-based distributed control system. A communication protocol and a communication strategy between respective soft PLCs are specified in the IEC 61499 standard to weaken the functions of the specific communication protocol, so a programmer can program soft PLCs and soft guardians to be deployed, only according to the control logic of the entire distributed control system without taking into account the communication protocol and the communication strategy between the respective soft PLCs, and further allocate the respective soft PLCs according to the IEC 61131 standard after the control logic of the entire distributed control system is distributed. The soft PLCs and the soft guardians deployed on the respective servers are programmed according to both the IEC 61499 standard and the IEC 61131 standard so that they can be programmed more compactly and easily, and their program is highly maintainable. The programmer edits soft PLC topology information, and a set of instructions of the soft PLCs on the editor as needed. The soft PLC topology information, and control logic source codes of the soft PLCs are translated into a set of machine instructions executable in a running environment, in the compiler.

The respective servers in the server cluster 102 can be industry servers, and each server in the server cluster 102 is deployed with a virtual operating system. The server is configured to receive an initialization deployment instruction, where the initialization deployment instruction includes soft PLC topology information, soft guardian topology information, real-time operating system information of the soft PLCs, and real-time operating system information of the soft guardians; and to deploy the soft PLCs, the soft guardians, real-time operating system of the soft PLCs, and real-time operating system of the soft guardians on the virtual operating system of the server according to the initialization deployment instruction which is programmed according to both the IEC 61499 standard and the IEC 61131 standard. Here the virtual operating system can be an Interwell OS system, the soft PLCs can be Run Time Environment (RTE) software, and the real-time operating system can be Unix kernel software, e.g., the "DeltaOS" system. The Unix kernel software is a multi-user and multi-task operating system, which is a time-division operating system supporting multiple processor architectures. Since the real-time operating system of the soft PLC, and the real-time operating system of the soft controller are deployed on each server in the server cluster 102, the device to be controlled by each soft PLC, and the entire distributed control system can be made more real-time using the real-time operating system.

The I/O bus 103 is configured to obtain and execute an input to control the device 104 to be controlled in an industrial field to execute corresponding instructions, and the device 104 to be controlled can be an electromotor, a mechanical arm, etc.

In the embodiment of the disclosure, the soft guardian is simulation guardian deployed on the server, and configured to monitor operating state of the soft PLC. The soft guardian can be deployed in a number of implementations. In a first implementation, the soft guardian can be deployed onto the same server as soft PLC(s). In order to lower a risk when the same server fails, the soft guardian is typically not deployed on the same server as soft PLC(s) to be monitored. In a second implementation, the soft guardian is deployed separately onto a server. Optionally one or more soft guardians can be deployed in either implementation to prevent the case that when some soft guardian fails, operating state of the soft PLC cannot be monitored in real time.

Figure 2:
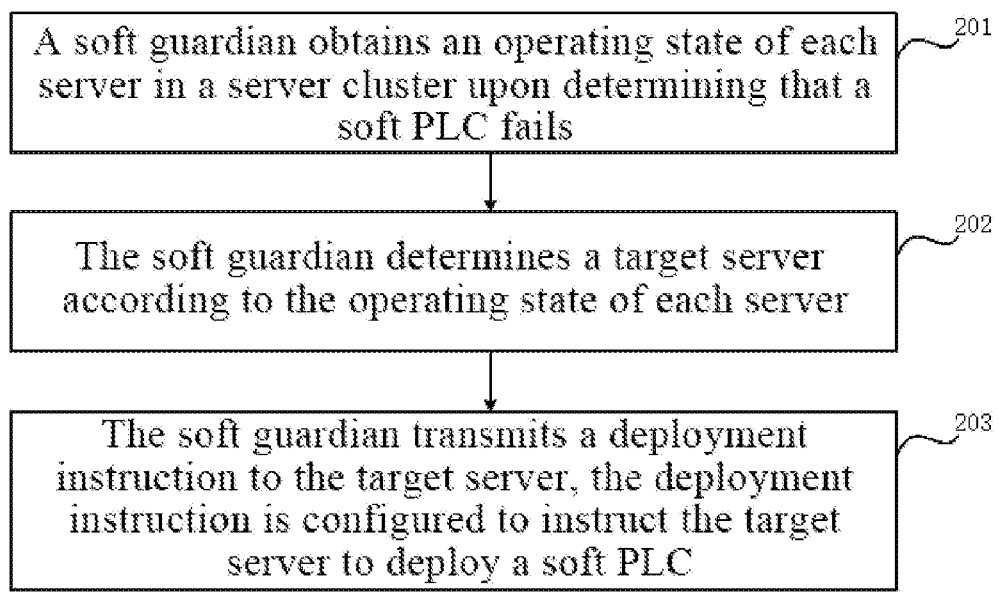
FIG. 2 is a schematic flow chart of a method for disaster tolerance in a PLC-based distributed control system according to an embodiment of the disclosure.

Further to the system architecture as illustrated in FIG. 1, FIG. 2 illustrates a schematic flow chart of a method for disaster tolerance in a PLC-based distributed control system according to an embodiment of the disclosure, and as illustrated in FIG. 2, the method for disaster tolerance in a PLC-based distributed control system includes the following steps.

In the step 201, a soft guardian obtains an operating state of each server in a server cluster upon determining that a soft PLC fails.

In the step 202, the soft guardian determines a target server according to the operating state of each server.

In the step 203, the soft guardian transmits a deployment instruction to the target server, wherein the deployment instruction is configured to instruct the target server to deploy a soft PLC.

In the embodiment of the disclosure, soft PLC, and real-time operating system of the soft PLC are deployed on each server in the server cluster, so each soft PLC can control the devices in a more real-time manner using the real-time operating system of the soft PLC, and the entire distributed control system can be made more real-time using real-time operating systems of soft guardian.

Furthermore the soft guardian obtains the operating state of each server in the server cluster upon determining that the soft PLC fails; determines the target server according to the operating state of each server; and transmits the deployment instruction to the determined target server so that the soft PLC is redeployed automatically on the target server without hindering the entire distributed control system from operating normally; and in this way, the disaster tolerance of the distributed control system can be improved, and the distributed control system can be maintained easily.

In the embodiment of the disclosure, a programmer edits an initialization deployment instruction in advance on a client by programming it according to both the IEC 61499 standard and the IEC 61131 standard as needed in reality: the initialization deployment instruction includes a topology structure between the servers in the server cluster, the soft PLC topology information, real-time operating system information of the soft PLCs, real-time operating system information of the soft guardians, soft guardian topology information, and a set of instructions of the soft PLCs, where the set of instructions of the soft PLCs include a first set of event-driven instructions, and a second set of periodically-polled and event-driven instructions; and the soft PLC topology information includes a mapping relationship between each soft PLC and each server, and a mapping relationship between each soft guardian and each soft PLC. Thereafter the client translates these items edited in the editor into machine instructions executable in a running environment, in a compiler, and transmits them to the respective servers in the cluster of servers.

Optionally after each server in the cluster of servers receives the initialization deployment instruction transmitted by the client, the each server deploys the soft PLC(s), the soft guardian(s), real operating systems of the soft PLC(s), and real operating system(s) of the soft guardian(s) on the virtual operating system of the server according to the initialization deployment instruction, and transmits a response of successful deployment to the client. The client decides to start each soft PLC and the soft guardian into operation, upon reception of the response of successful deployment transmitted by each server in the cluster of servers. Optionally the virtualized soft guardian on each server determines the soft PLC(s) to be monitored according to the soft PLC topology information, and each soft PLC determines instructions to be executed according to the set of instructions of the soft PLC(s). Each server in the server cluster starts the soft PLC(s) and the soft guardian(s) according to a start instruction transmitted by the client upon reception of the start instruction, and after the soft PLC(s) and the soft guardian(s) are started, the soft PLC(s) execute the corresponding instructions according to the set of instructions of the soft PLC(s), and the soft guardian monitors the corresponding soft PLC(s) according to the soft PLC topology information.

In the embodiment of the disclosure, the deployed soft PLCs, the soft guardians, the real-time operating systems of the soft PLCs, and the real-time operating systems of the soft guardians can be virtualized the soft PLCs, the soft guardians, the real-time operating systems of the soft PLCs, and the real-time operating systems of the soft guardians using a virtualization technology.

Figure 3:
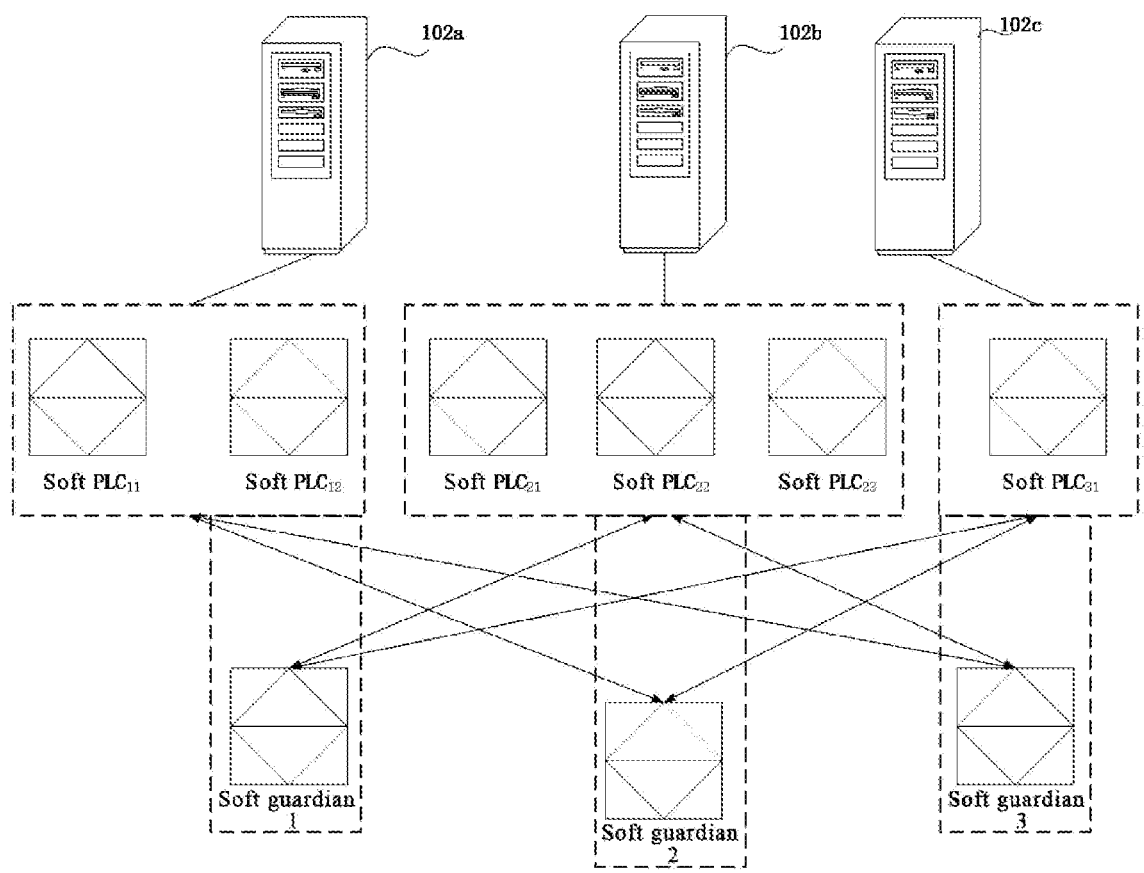
FIG. 3 is a schematic architectural diagram of a deployment relationship between virtual PLCs and servers according to an embodiment of the disclosure.

For the sake of convenient understanding, FIG. 3 illustrates a deployment relationship between soft PLCs and servers according to an embodiment of the disclosure. As illustrated in FIG. 3, a soft $PLC_{11}$ and a soft $PLC_{12}$, and a soft guardian 1 are deployed on a server 102a; a soft $PLC_{21}$, a soft $PLC_{22}$, and a soft $PLC_{23}$, and a soft guardian 2 are deployed on a server 102b; and a soft $PLC_{31}$ and a soft guardian 3 are deployed on a server 102c, where the soft guardian 1 is responsible for monitoring the soft $PLC_{21}$, the soft $PLC_{22}$, the soft $PLC_{23}$, and the soft $PLC_{31}$; the soft guardian 2 is responsible for monitoring the soft $PLC_{11}$, the soft $PLC_{12}$, and the soft $PLC_{31}$; and the soft guardian 3 is responsible for monitoring the soft $PLC_{11}$, the soft $PLC_{12}$, the soft $PLC_{21}$, the soft $PLC_{22}$, and the soft $PLC_{23}$. In order to lower a risk when the same server fails, a soft guardian is typically not deployed on the same server as soft PLCs monitored by the soft guardian.

In the embodiment of the disclosure, before the soft guardian determines that the soft PLC fails, the method further includes: the soft guardian obtains the soft PLC topology information, where the soft PLC topology information includes a mapping relationship between the soft guardians and the soft PLCs; and the soft guardian monitors the operating state of the soft PLC(s) according to the mapping relationship.

In the embodiment of the disclosure, the mapping relationship between the soft guardians and the soft PLCs can particularly indicate that the soft guardian shall monitor which soft PLC(s), and after the soft guardian determines the soft PLC(s) to be monitored, the soft guardian monitors the operating state(s) of the soft PLC(s). In a specific implementation, the soft guardian transmits a heartbeat message to each monitored soft PLC, and when the soft PLC is operating normally, it feeds a response to the heartbeat message to the soft guardian; and when the soft guardian has not received any response of the soft PLC to the heartbeat message for a preset time length, the soft guardian determines that the operating state of the soft PLC is "Failing".

When the soft guardian determines that the soft PLC fails, in order not to hinder the entire distributed control system from operating, the soft guardian shall transmit the deployment instruction to the target server to deploy the new soft PLC corresponding to the failing soft PLC.

In the embodiment of the disclosure, the soft guardian transmits the deployment instruction to the target server as follows: the soft guardian determines configuration information of the soft PLC, and a set of instructions of the soft PLC, where the set of instructions of the soft PLC includes a first set of event-driven instructions, and a second set of periodically-polled and event-driven instructions; and the soft guardian transmits the deployment instruction including the configuration information of the soft PLC, and a set of instructions of the soft PLC to the target server.

In one optional implementation, the soft guardian obtains the operating state of each server in the server cluster upon determining that the soft PLC fails, and for example, it determines an occupancy ratio of Central Processing Unit (CPU) of each server, and determines the server with the lowest occupancy ratio of the CPU as the target server, or determines a server(s) with the occupancy ratio(s) of the CPU(s) below a first threshold as the target server. There may be one or more target servers. When there are a plurality of target servers, then the deployment instruction carries a deployment rule between the plurality of target servers, and for example, the failing soft PLC(s) can be deployed under an equal allocation rule, or according to the occupancy ratio of the CPU of each target server.

In the embodiment of the disclosure, after the soft guardian transmits the deployment instruction to the target server, the method further includes: the soft guardian updates the soft PLC topology information.

Optionally the soft PLC topology information further includes a mapping relationship between the soft PLCs and the servers. When the soft PLC fails, the soft guardian transmits the deployment instruction to the target server, and the target server deploys a new soft PLC corresponding to the failing soft PLC according to the deployment instruction, where the target server may or may not be the server where the failing soft PLC is located. When the target server is not the original server where the failing soft PLC is located, then the soft PLC topology in the soft guardian is updated, that is, the mapping relationship between the soft PLCs and the servers needs to be updated, thus making it easy to maintain them by a human operator and maintainer.

In the embodiment of the disclosure, the soft guardian monitors the operating state of each server, and transmits an alarm upon determining that there is a server in an abnormal state.

In the embodiment of the disclosure, the abnormal state includes that the server fails, or the current occupancy ratio of a CPU of the server is above a second threshold, where the second threshold is more than the first threshold. The soft guardian transmits an alarm upon determining that there is a server in an abnormal state in the server cluster, so that a human maintainer can be reminded of repairing the failing server timely, or particularly paying attention to the server with the occupancy ratio of the CPU above the second threshold, thus improving the disaster tolerance of the entire PLC-based distributed control system.

As can be apparent from the disclosure, in the embodiment of the disclosure, the soft Programmable Logic Controllers (PLCs), and the real-time operating systems of the soft PLCs are deployed on each server in the server cluster, so the each soft PLC can control the devices to be controlled, in a more real-time manner using the real-time operating system of the soft PLC, and the entire distributed control system can be made more real-time using the real-time operating system of the soft guardian.

Furthermore the soft guardian obtains the operating state of each server in the server cluster upon determining that the soft PLC fails; determines the target server according to the operating state of the each server; and transmits the deployment instruction to the determined target server so that the soft PLC is redeployed automatically on the target server without hindering the entire distributed control system from operating normally; and in this way, the disaster tolerance of the distributed control system can be improved, and the distributed control system can be maintained easily.

Figure 4:
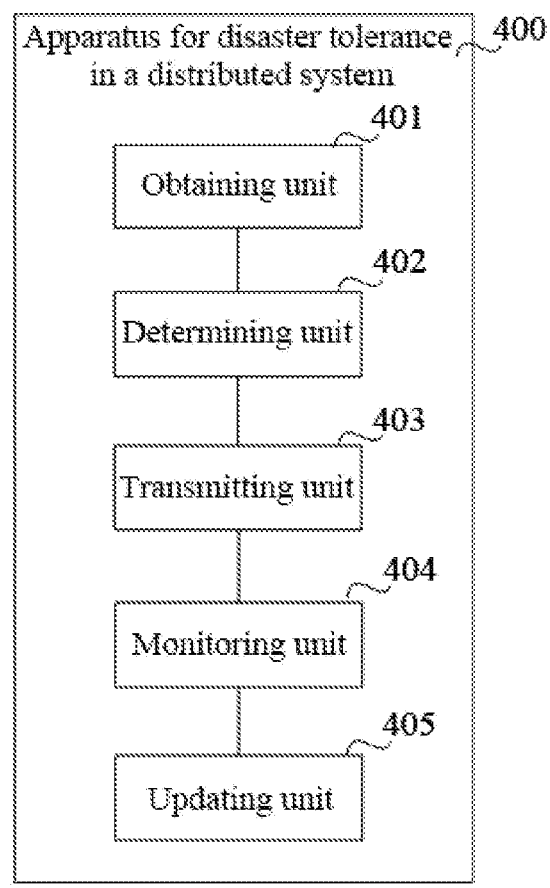
FIG. 4 is a schematic structural diagram of an apparatus for disaster tolerance in a PLC-based distributed control system according to an embodiment of the disclosure.

Based upon the same technical idea, an embodiment of the disclosure further provides an apparatus for disaster tolerance in a PLC-based distributed control system, and the apparatus can perform the method according to the embodiment above of the disclosure. The apparatus is applicable to a server cluster deployed with a virtualized operating system, and soft Programmable Logic Controllers (PLCs), real-time operating systems of the soft PLCs, soft guardians, and real-time operating systems of the soft guardians are deployed on respective servers in the server cluster. FIG. 4 illustrates a schematic structural diagram of an apparatus for disaster tolerance in a PLC-based distributed control system according to an embodiment of the disclosure, and as illustrated in FIG. 4, the apparatus 400 includes an obtaining unit 401, a determining unit 402, and a transmitting unit 403, and optionally includes a monitoring unit 404 and an updating unit 405.

The obtaining unit is configured to obtain the operating state of each server in the server cluster upon determining that a soft PLC fails; the determining unit is configured to determine a target server according to the operating state of the each server; and the transmitting unit is configured to transmit a deployment instruction to the target server, wherein the deployment instruction is configured to instruct the target server to deploy a soft PLC.

In the embodiment of the disclosure, soft Programmable Logic Controllers (PLCs), and real-time operating systems of the soft PLCs are deployed on each server in the server cluster, so the each soft PLC can control devices to be controlled, in a more real-time manner using the real-time operating system of the soft PLC, and the entire distributed control system can be made more real-time using the real-time operating systems of the soft guardian.

Furthermore each soft guardian obtains the operating state of the each server in the server cluster upon determining that the soft PLC fails; determines the target server according to the operating state of the each server; and transmits the deployment instruction to the determined target server so that the soft PLC is redeployed automatically on the target server without hindering the entire distributed control system from operating normally; and in this way, the disaster tolerance of the distributed control system can be improved, and the distributed control system can be maintained easily.

Optionally the obtaining unit is further configured to obtain soft PLC topology information, where the soft PLC topology information includes a mapping relationship between the soft guardians and the soft PLCs; and the apparatus further includes a monitoring unit configured to monitor the operating states of one or more soft PLCs according to the mapping relationship.

Optionally the determining unit is configured: to determine a set of instructions of the soft PLC, where the set of instructions of the soft PLC includes a first set of event-driven instructions, and a second set of periodically-polled and event-driven instructions; and the transmitting unit is configured to transmit the deployment instruction including the set of instructions of the soft PLC to the target server.

Optionally the apparatus further includes an updating unit configured to update the soft PLC topology information.

Optionally the monitoring unit is further configured: to monitor the operating state of the each server; and the transmitting unit is configured to transmit an alarm upon determining that there is a server in an abnormal state.

As can be apparent from the disclosure, in the embodiment of the disclosure, the soft Programmable Logic Controllers (PLCs), and the real-time operating systems of the soft PLCs are deployed on the respective servers in the server cluster, so the respective soft PLCs can control the devices to be controlled, in a more real-time manner using the real-time operating systems of the soft PLCs, and the entire distributed control system can be made more real-time using the real-time operating system of the soft guardian.

Furthermore the soft guardian obtains the operating state of the each server in the server cluster upon determining that the soft PLC fails; determines the target server according to the operating state of the each server; and transmits the deployment instruction to the determined target server so that the soft PLC is redeployed automatically on the target server without hindering the entire distributed control system from operating normally; and in this way, the disaster tolerance of the distributed control system can be improved, and the distributed control system can be maintained easily.

Second Embodiment

Further to the first embodiment, in this embodiment, each server in the server cluster has one or more physical cores, and a plurality of micro kernels operate on each physical core. In this embodiment, the micro kernel can be a virtualized real-time operating system, and the physical core can be a physical core of a CPU, where the virtualized real-time operating system can be a virtualized real-time operating system on which a plurality of Unix-like kernels are installed, e.g., an Interwell OS system on which "DeltaOS" are installed, where the Unix kernel software is a multi-user and multi-task operating system, which is a time-division operating system supporting multiple processor architectures. Based on the control logic of the PLC-based distributed control system, the PLC-based distributed control system includes a plurality of correlated virtual PLCs, and each virtual PLC operates on different one of the micro kernels. When there is a virtual PLC failing, the virtual PLC can be reconstructed to perform corresponding functions of the failing virtual PLC. The virtualized real-time operating system is realized based on Multi-Core CPU, virtualized instruction and virtualized interface, and has the following characteristic of security isolation: physical memory access isolation, I/O device access isolation, I/O device interrupt reception isolation and time-division scheduling. The virtual PLC is the PLC running on the virtualized operating system, the virtual PLC includes: virtualized real-time operating system, PLC system program running on the virtualized real-time operating system and the user program compiled result file running on the PLC system program. The soft guardian is a virtualized monitor program running on the virtualized operating system. The soft guardian includes: the virtualized real-time operating system and guardian kernel running on the virtualized real-time operating system, the guardian kernel is the main application software for realizing the function of the guardian. The physical memory access isolation refers to that the virtualized operating system accesses the physical memory through security kernel of the operating system to achieve the isolation of the physical memory. I/O device access isolation refers to that the virtualized operating system accesses the I/O device through security kernel of the operating system, to achieve the isolation of the I/O device. I/O device interrupt reception isolation refers to that the virtualized operating system receives the I/O device interrupt forwarded by the security kernel of the operating system, to achieve the isolation of I/O device interrupt. The time-division scheduling refers to that the security kernel of the operating system uses the time-division scheduling scheme to achieve parallel running of multiple virtualized operating systems on one physical core.

Figure 5A:
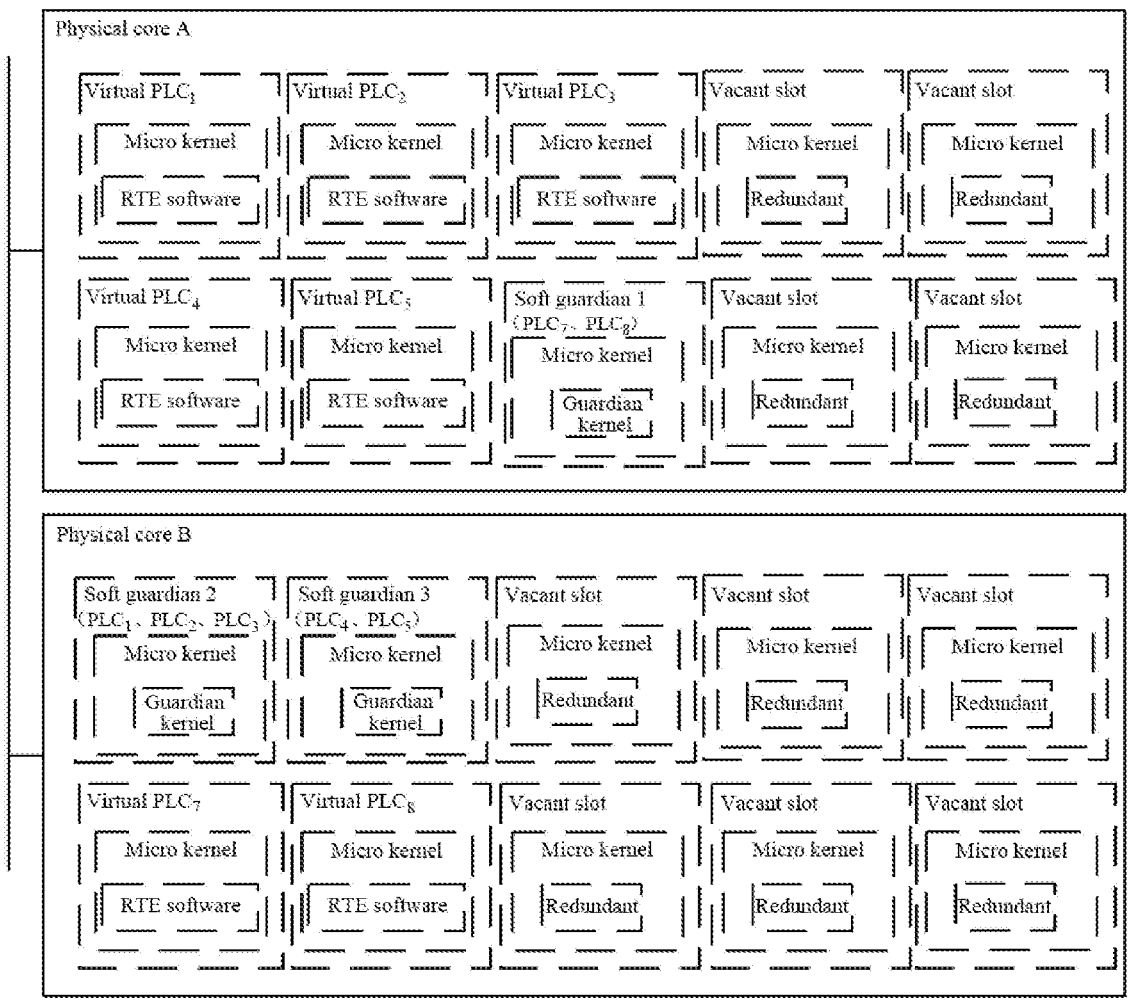
FIG. 5A is a schematic structural diagram of internal components of a sever according to an embodiment of the disclosure.

FIG. 5A illustrates a schematic structural diagram of internal components of a sever according to an embodiment of the disclosure. The server can be any one of the server 102a, the server 102b, and the server 102c according to the first embodiment above. As illustrated in FIG. 5A, the server includes a physical core A and a physical core B, ten virtualized real-time operating systems are deployed on the physical core A, RTEs are deployed on any five of the ten virtualized real-time operating systems, and one guardian kernel is deployed on any one of the virtualized real-time operating systems, so that a virtual $PLC_1$, a virtual $PLC_2$, a virtual $PLC_3$, a virtual $PLC_4$, a virtual $PLC_5$, and a soft guardian 1 can be deployed on the physical core A. The four virtualized real-time operating systems on which neither RTE nor guardian kernel is deployed can be referred to as vacant slots, or these virtualized real-time operating systems can be regarded as redundant virtualized real-time operating systems. Ten virtualized real-time operating systems are deployed on the physical core B, RTEs are deployed on any two of the virtualized real-time operating systems, and guardian kernels are deployed on any two of the virtualized real-time operating systems, so that a virtual $PLC_7$, a virtual $PLC_8$, a soft guardian 2, and a soft guardian 3 can be deployed on the physical core B. The six virtualized real-time operating systems on which neither RTE nor guardian kernel is deployed can be referred to as vacant slots, or these virtualized real-time operating systems can be regarded as redundant virtualized real-time operating systems. Optionally the physical cores can alternatively be hardware PLCs. The soft guardian can alternatively be regarded as simulative guardian deployed on micro kernel on the physical core of the server to monitor operating state of the virtual PLC. By way of an example, the soft guardian 1 monitors the virtual $PLC_7$ and the virtual $PLC_8$, the soft guardian 2 monitors the virtual $PLC_1$, the virtual $PLC_2$, and the virtual $PLC_3$, and the soft guardian 3 monitors the virtual $PLC_4$ and the virtual $PLC_5$. Run Time Environment (RTE) is one implementation of the system program of the virtual PLC.

Figure 5B:
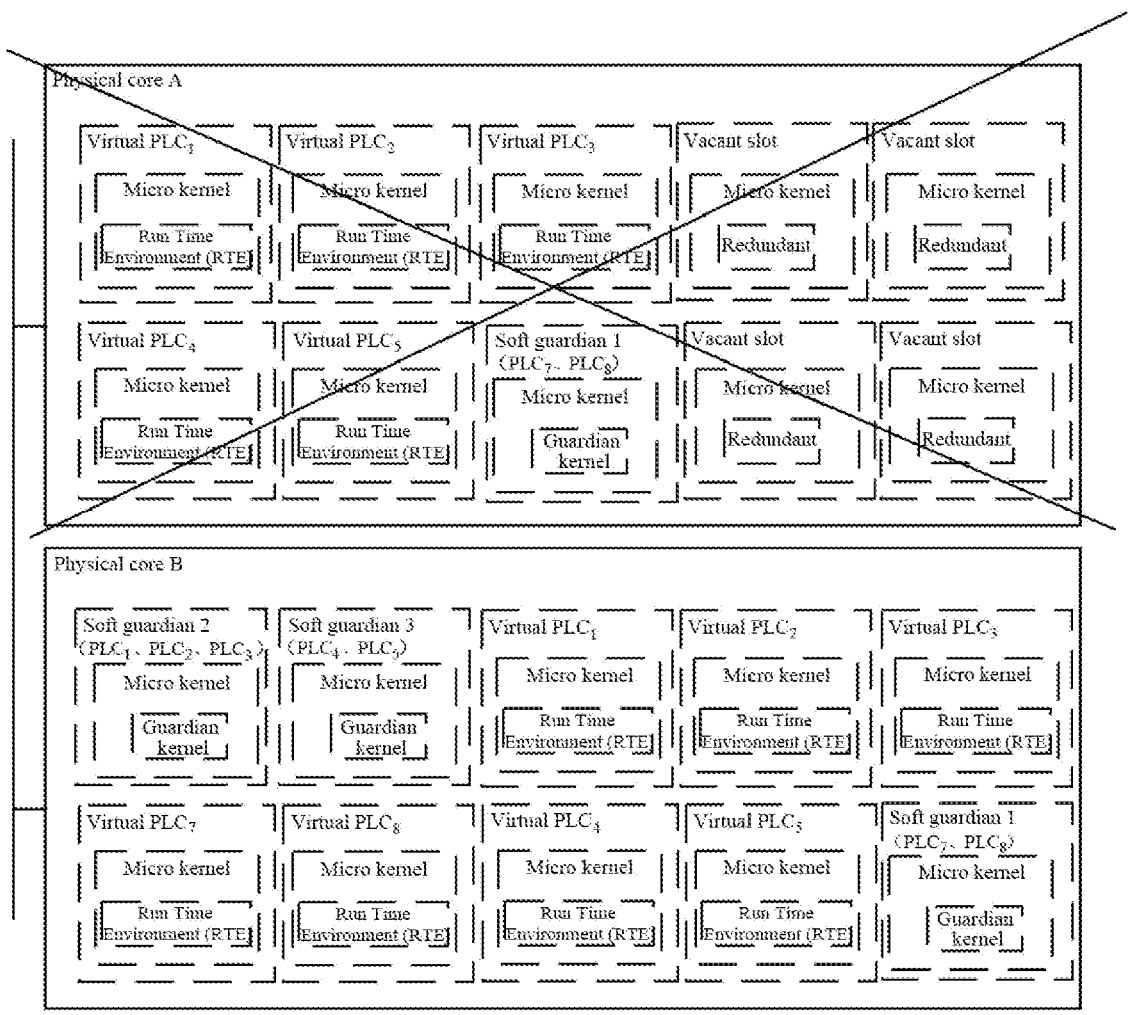
FIG. 5B is a schematic structural diagram of deployed internal components of a server after a physical core on the sever fails according to an embodiment of the disclosure.

Further to FIG. 5A above, FIG. 5B illustrates a schematic structural diagram of deployed internal components of the server after one physical core on the sever fails according to an embodiment of the disclosure. As illustrated in FIG. 5B, after the physical core A fails, the failing virtual $PLC_1$, virtual $PLC_2$, virtual $PLC_3$, virtual $PLC_4$, virtual $PLC_5$, and soft guardian 1 on the physical core A can be reconstructed on the vacant slots of the six virtualized real-time operating systems of the physical core B, thus resulting in the deployment structure on the physical core B as illustrated in FIG. 5B.

Figure 5C:
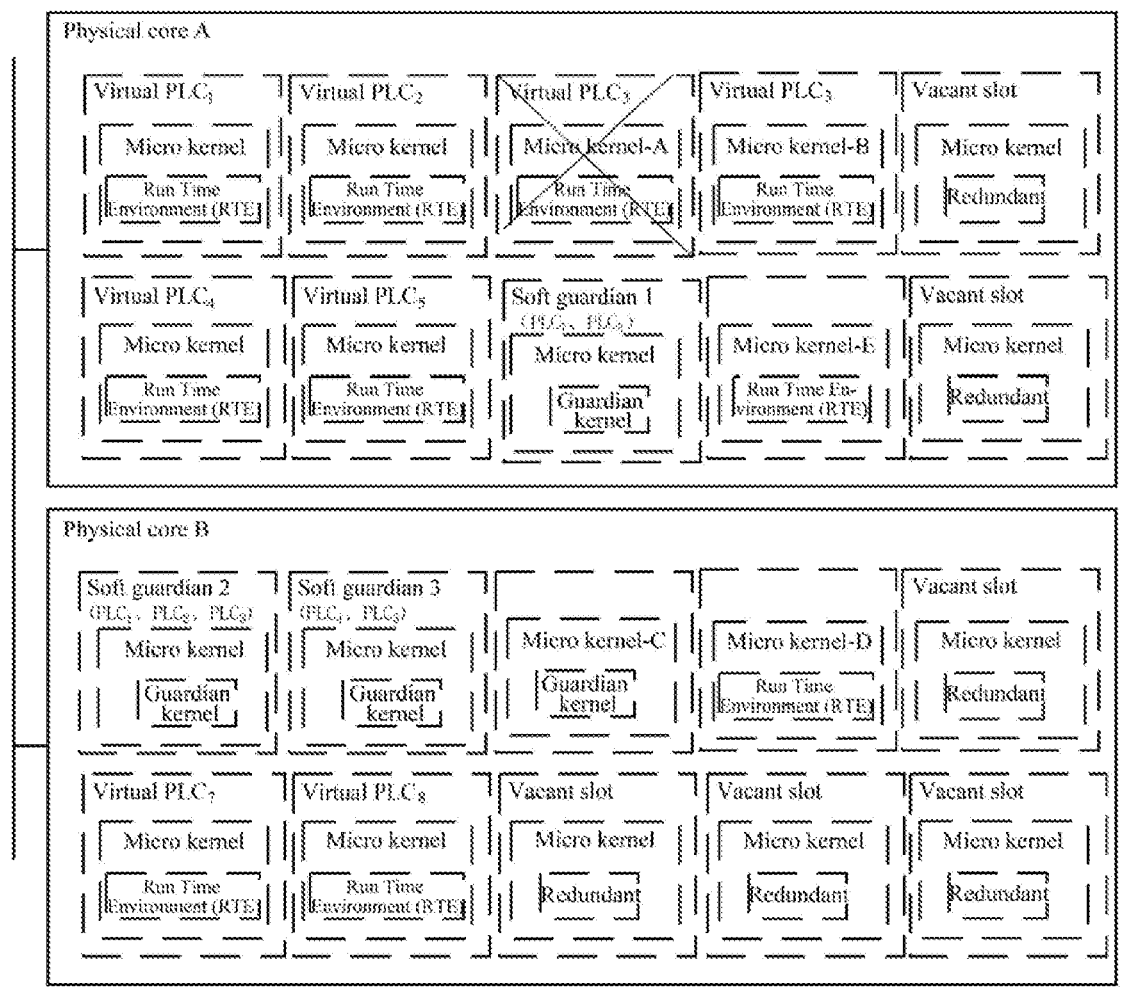
FIG. 5C is a schematic structural diagram of deployed internal components of a server after the virtual PLC3 fails according to an embodiment of the disclosure.
Figure 5D:
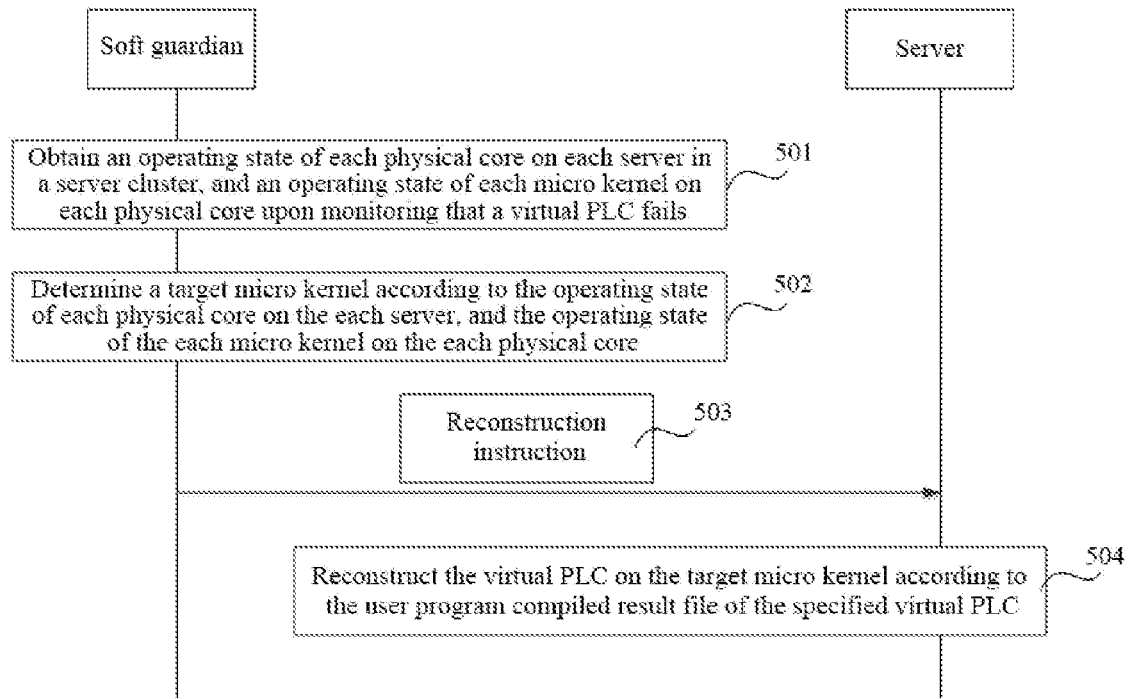
FIG. 5D is a schematic flow chart of a method for monitoring and reconstructing a software-defined PLC according to an embodiment of the disclosure.
Figure 6:
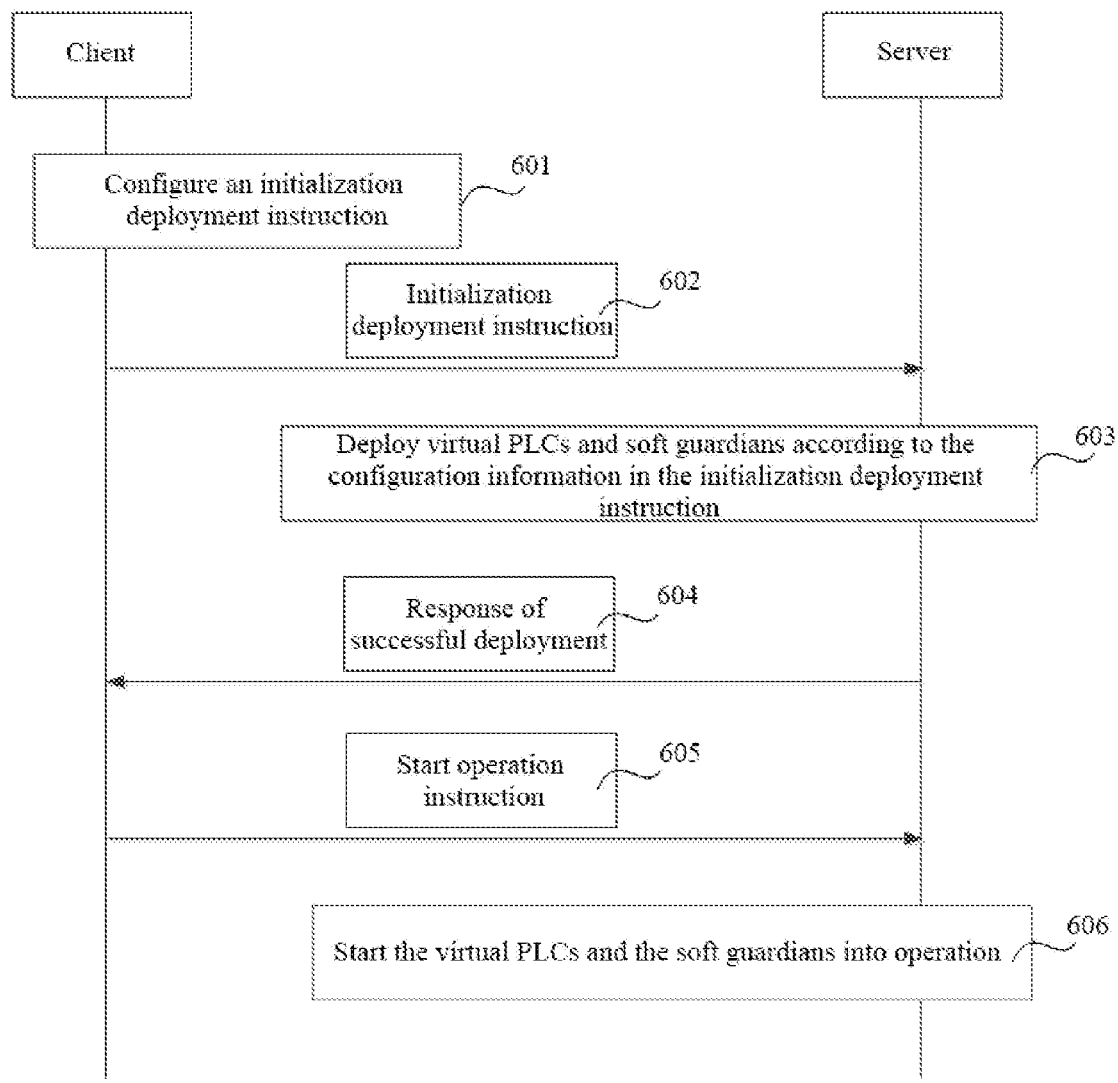
FIG. 6 is a schematic flow chart of a method for deploying by a server a virtual PLC or a guardian according to an embodiment of the disclosure.

Further to the disclosure above, FIG. 6 illustrates a schematic flow chart of a method for monitoring and reconstructing a software-defined PLC according to an embodiment of the disclosure. The software-defined PLC refers to that virtual PLC(s) to operate on each micro kernel, and a scheduling algorithm of the corresponding virtual PLC(s) on each micro kernel are determined in advance according to a user-defined scheme before the system is started, to perform industrial control of the PLC through the micro kernel. A server can be any one of the server 102a, the server 102b, and the server 102c as illustrated in FIG. 1 in the first embodiment above. As illustrated in FIG. 5D, the method includes the following steps.

In the step 501, a soft guardian obtains an operating state of each physical core on each server in a server cluster and an operating state of each micro kernel of the each physical core, upon monitoring that a virtual PLC fails.

One or more soft guardians can be deployed in the server cluster, and one or more specified virtual PLCs to be monitored by each soft guardian are preconfigured in the server. After the server runs, each soft guardian monitors whether the specified virtual PLC fails. When the soft guardian monitors that the specified virtual PLC fails, the soft guardian obtains an operating state of each physical core on each server in a server cluster and an operating state of each micro kernel of the each physical core. Here the operating state of each physical core on each server includes first load information of each physical core on each server, and the first load information can be the occupancy ratio of the physical core. The operating state of each micro kernel includes second load information of each micro kernel, and the second load information can be the occupancy ratio of the micro kernel.

In connection with FIG. 5A above, all of the soft guardian 1, the soft guardian 2, and the soft guardian 3 can obtain operating states of the physical core A and the physical core B, and can also obtain operating states of the ten micro kernels on the physical core A, and operating states of the ten micro kernels on the physical core B.

In the step 502, the soft guardian determines a target micro kernel according to the operating state of the each physical core on the each server, and the operating state of the each micro kernel on the each physical core.

In the embodiment of the disclosure, the target micro kernel can be determined in the following first and second implementations.

In a first implementation, the soft guardian obtains first load information of the each physical core on each server in the server cluster, and second load information of each micro kernel on each physical core, and determines the target micro kernel according to the first load information of each physical core on each server, and the second load information of each micro kernel on each physical core.

In the embodiment of the disclosure, the first load information is occupancy ratio of the physical core, and the second load information is occupancy ratio of the micro kernel. The soft guardian can obtain the occupancy ratio of each physical core of each server in the server cluster, and the occupancy ratio of each micro kernel. In one implementation, the physical core with the lowest occupancy ratio is determined as a target physical core, and the micro kernel with the lowest occupancy ratio among the micro kernels in the target physical core is further determined as a target micro kernel. In another implementation, a physical core with the occupancy ratio below a first threshold among the physical cores is determined as a target physical core, and a micro kernel(s) with the occupancy ratio(s) below a second threshold among the micro kennels in the target physical kernel is (are) determined as a target micro kernel(s), where the first threshold may or may not be the same as the second threshold. The number of determined target micro kernels may be one or more. When a plurality of target micro kernels are determined, then some deployment rule, e.g., an equal deployment rule, a random deployment rule, a rule of deployment as per weights of respective micro kernels, may be pre-stored in the soft guardian.

In a second implementation, configuration information obtained by the soft guardian can include a deployment strategy to be applied when a specified virtual PLC fails, and the deployment strategy to be applied when a specified virtual PLC fails indicates priorities of physical cores for reconstructing the specified virtual PLC, and priorities of micro kernels on each physical core for reconstructing the specified virtual PLC, after the specified virtual PLC fails. In some embodiment, the soft guardian determines the target micro kernel according to the first load information of each physical core on each server, the second load information of each micro kernel on each physical core, and the deployment strategy to be applied when a specified virtual PLC.

In the second implementation above, there are two possible implementations (an implementation A and an implementation B) in the embodiment of the disclosure.

In the implementation A, the physical core with the highest priority is determined as a quasi-target physical core according to the priorities of the physical cores. When the first load information of the quasi-target physical core is below a first threshold, then the quasi-target physical core may be determined as a target physical core; and when the first load information of the quasi-target physical core is not below the first threshold, then the physical core with the second highest priority may be determined as a quasi-target physical core. This process is repeated until the target physical core is determined. Thereafter a target micro kernel is determined from the target physical core, where the micro kernel with the highest priority on the target physical core is determined as a quasi-target micro kernel. When the second load information of the quasi-target micro kernel is below a second threshold, then the quasi-target micro kernel may be determined as a target micro kernel; and when the second load information of the quasi-target micro kernel is not below the second threshold, then the micro kernel with the second highest priority may be determined as a quasi-target micro kernel. This process is repeated until the target micro kernel is determined on the target physical core.

In the implementation B, each physical core with the first load information below a first threshold among all physical cores are determined as quasi-target physical cores, and thereafter the quasi-target physical core with the highest priority among the quasi-target physical cores is determined as a target physical core. Next each micro kernel with second load information below a second threshold among all micro kernels on the target physical core is determined as the quasi-target micro kernel, and the quasi-target micro kernel with the highest priority among the quasi-target micro kernels is determined as a target micro kernel.

In a possible implementation, the target micro kernel may or may not be a micro kernel on the server where the failing virtual PLC is located. In a possible implementation, when the soft guardian determines the target micro kernel on which the specified virtual is to be reconstructed, the soft guardian needs to take into account whether each micro kernel is preinstalled with the system program of the virtual PLC, in addition to the operating state of the each physical core on the each server, and the operating state of the each micro kernel on the each physical core. In order to improve the reconstruct speed, when the load of the micro kernel preinstalled with the system program of the virtual PLC and the load of the physical core of the micro kernel are allowable, the micro kernel preinstalled with the system program of the virtual PLC is given preference as the target micro kernel. FIG. 5C is a schematic structural diagram of deployed internal components of a server after the virtual PLC3 fails according to an embodiment of the disclosure. As shown in FIG. 5C, the micro kernel on which neither RTE nor guardian kernel is preinstalled can be referred to as vacant slot. The micro kernel-C is preinstalled with the guardian kernel, and the soft guardian can be deployed on the micro kernel-C. The micro kernels on which the RTE is deployed but the virtual PLC isn't deployed include the micro kernel-B, micro kernel-E and micro kernel-D. After the virtual PLC3 fails, the server on which the virtual PLC3 runs can reconstruct the virtual PLC3 on any one of the micro kernel-B, micro kernel-E and micro kernel-D. The soft guardian 2, which monitors the virtual PLC3, can determine which micro kernel is used for deploying the virtual PLC3. The soft guardian 2, which monitors the virtual PLC3, determines the micro kernel-B as the target micro kernel on which the virtual PLC3 is to be reconstructed, according to the operating state of each physical core on each server, and the operating state of each micro kernel of each physical core. When the server on which the virtual PLC3 runs reconstructs the virtual PLC3, the server starts RTE preinstalled on the micro kernel-B and executes the user program compiled result file of the virtual PLC3 according to the reconstruction instruction.

In the step 503, the soft guardian transmits a reconstruction instruction to the target micro kernel, where the reconstruction instruction is configured to instruct the specified virtual PLC to be reconstructed on the target micro kernel.

Correspondingly the server receives the reconstruction instruction from the soft guardian, where the reconstruction instruction includes a user program compiled result file of a specified virtual PLC monitored by the soft guardian, and the target micro kernel on which the specified virtual PLC is to be reconstructed.

In an optional implementation, the configuration information obtained by the soft guardian includes one or more specified virtual PLCs to be monitored by the soft guardian, and the user program compiled result file of each of the one or more specified virtual PLCs. It can be determined from the configuration information including the specified virtual PLCs to be monitored by the soft guardian that: for any one soft guardian, the soft guardian should monitor which virtual PLC(s), and it also determined that: for any one virtual PLC, the virtual PLC should be monitored by which soft guardian. One implementation of the one or more specified virtual PLCs to be monitored by the soft guardian in the configuration information can be a mapping relationship of the soft guardians and the virtual PLCs in the configuration information. It can be determined from the mapping relationship that any one soft guardian monitors which virtual PLC(s), and any one virtual PLC should be monitored by which soft guardian. The specified virtual PLC(s) to be monitored by the soft guardian may or may not be located on the same physical core as the soft guardian. Optionally the soft guardian monitors the operating state of the specified virtual PLC according to the configuration information. The configuration information obtained by the soft guardian can be the initialization deployment instruction from the server, which received it from the client. The initialization deployment instruction refers to the corresponding description of FIG. 6.

In a possible implementation, the soft guardian transmits the reconstruction instruction including the user program compiled result file of the specified virtual PLC to the target micro kernel. The user program of the virtual VLC is program for the purpose of industry control, and can include task items, input and output information, the set of task instructions, etc. The set of instructions can be set of instructions including opening a valve, closing a valve, starting a catching arm, or other control instructions in a process flow. A task is means of loading a set of instructions by a virtual PLC, and can include a periodical task and a triggered task, and have the attributes of a periodicity, a priority, a trigger condition, etc., where the periodical task is also referred to as a periodically polled task, and the triggered task is also referred to as an event-driven task. The input and output information includes the input information, which refers to hardware(s) from which the information is acquired and the acquired information, and the output information which refers to hardware(s) to which the information is to be output and the output information.

In the step 604, the server reconstructs the specified virtual PLC on the target micro kernel according to the user program compiled result file of the specified virtual PLC.

In a possible implementation, system program of the virtual PLC preinstalled on the target micro kernel is started on the target micro kernel; and the user program compiled result file of the specified virtual PLC is executed on the system program of the virtual PLC. In a possible implementation according to the embodiment of the disclosure, the system program of the virtual PLC reads the user program of the virtual PLC, initializes a resource, and executes the set of task instructions in the user program to thereby deploy the virtual PLC successfully. In this way, instead of compiling the user program again, any one of the sets of instructions in the user program can be read and executed directly to reconstruct the virtual PLC, so that the virtual PLC can be reconstructed rapidly as compared with the prior art in which PLCs are backed up redundantly. Furthermore the server can reconstruct the virtual PLC without being powered off, so as not to hinder normal virtual PLCs in the entire distributed control system from operating normally.

In connection with FIG. 5A, FIG. 5B and FIG. 5C above, the system program of the virtual PLC preinstalled on the target micro kernel can be RTE software. The RTE software can provide the user program of the virtual PLC with a function for accessing a hard resource (e.g., a memory, a CPU, etc.), and input and output functions (e.g., for acquiring information from a sensor, outputting information to a controlled device, etc.), and hide a hardware environment and an external communication environment from the user program, so that the user program is only interested in a control logic of the PLC, output and input items thereof, etc., but not interested in how to output information to the outside, how to acquire external information, how to access a hardware resource, etc.

A PLC is backed up redundantly in the traditional PLC-based distributed control system, that is, one or more redundant PLCs are configured for the PLC so that the PLC is backed up hotly. After the PLC fails, one of its backup PLCs is instructed to operate. After the PLC and its backup PLCs all fail, there is such a logic relationship between the PLCs in the distributed system that the other PLCs in the distributed system cannot operate, and the server shall be powered off so that the PLCs are replaced and reconnected. However as can be apparent from the step 501 to the step 504 above in the embodiment of the disclosure, a plurality of micro kernels are virtualized on a physical core, and a virtual PLC operates on each micro kernel (virtual operating system). If the virtual PLC fails, then the PLC may be reconstructed on another micro kernel, and since the respective micro kernels are independent of each other, the virtual PLC can be reconstructed without powering off the server and reconnecting the server, so that the virtual PLC can be reconstructed without powering off the server, so as not to hinder the other PLCs in the system from operating.

Furthermore virtualized real-time operating systems are deployed on the physical cores of the respective servers in the server cluster, and virtual PLCs are deployed on the virtualized real-time operating systems, so that the each PLC can control devices to be controlled, in a more real-time manner, and the entire system can be made more real-time because the soft guardians are deployed on the virtualized real-time operating systems.

Before the step 501 above, each server can deploy virtual PLC(s) or soft guardian(s) on the micro kernel(s) of the physical core(s). FIG. 6 illustrates a schematic flow chart of a method for deploying by a server a virtual PLC or a guardian according to an embodiment of the disclosure. The server can be any one of the server 102a, the server 102b, and the server 102c as illustrated in FIG. 1 in the first embodiment above. As illustrated in FIG. 6, the method includes the following steps.

In the step 601, a client configures an initialization deployment instruction.

Specifically the configuration information in the initialization deployment instruction is configured to deploy a soft guardian on a specified micro kernel on a specified physical core, and to deploy a virtual PLC on a specified micro kernel on a specified physical core, and to make the soft guardian monitor one or more specified virtual PLCs. It can be determined, from the configuration information configured to deploy the soft guardian on the specified micro kernel on the specified physical core, which physical core and which micro kernel any one soft guardian is deployed on. It can be determined, from the configuration configured to deploy the virtual PLC on the specified micro kernel on the specified physical core, which physical core and which micro kernel any one virtual PLC is deployed on. It can be determined, from the configuration information configured to make the soft guardian monitor the specified virtual PLCs, that: for any one soft guardian, the soft guardian should monitor which virtual PLC(s), and it also be determined that: for any one virtual PLC, the virtual PLC should be monitored by which soft guardian. The specified virtual PLCs monitored by the soft guardian are located on the same physical core as the soft guardian, or the specified PLCs monitored by the soft guardian are not located on the same physical core as the soft guardian. That is, the virtual PLC and the soft guardian monitoring the virtual PLC are located on the same physical core, or located on different physical cores.

In connection with FIG. 5A above, the soft guardian 1 is not located on the same physical core as the specified virtual PLC$_7$ and virtual PLC$_8$ monitored by the soft guardian 1, the soft guardian 2 is not located on the same physical core as the specified virtual PLCs, virtual PLC$_2$, and virtual PLC$_3$ monitored by the soft guardian 2, and the soft guardian 3 is not located on the same physical core as the specified virtual PLC$_4$ and virtual PLC$_5$ monitored by the soft guardian 3. As illustrated in FIG. 5B, the soft guardian 1 is located on the same physical core as the specified virtual PLC$_7$ and virtual PLC$_8$ monitored by the soft guardian 1, the soft guardian 2 is located on the same physical core as the specified virtual PLC$_1$, virtual PLC$_2$, and virtual PLC$_3$ monitored by the soft guardian 2, and the soft guardian 3 is located on the same physical core as the specified virtual PLC$_4$ and virtual PLC$_5$ monitored by the soft guardian 3.

Furthermore there may be the following two deployment schemes between the soft guardian and the server. In a first scheme, a soft guardian can be deployed onto the same server as the specified virtual PLC, that is, they can be deployed on different micro kernels of different physical cores of the same server. In order to lower a risk when the same server fails, a soft guardian can alternatively be deployed onto a different server from the specified virtual PLC. In a second scheme, all the soft guardians are deployed separately onto a server, that is, the different soft guardians can be deployed on different physical cores of the same server, which is different from specified virtual PLCs, and there is at least one backup server for the server deployed with soft guardians. Optionally one or more soft guardians can be deployed in either scheme so that operating states of the virtual PLCs can be monitored in real time even if some soft guardian fails.

In a possible implementation, the initialization deployment instruction can be generated by programming according to both the IEC 61499 standard and the IEC 61131 standard. Stated otherwise, the client translates items edited in an editor into a set of machine instructions executable in an operating environment, and transmits it to each server in a server cluster.

In the step 602, the client transmits the initialization deployment instruction to the server.

Corresponding the server receives the initialization deployment instruction from the client. In a possible implementation, the configuration information in the initialization deployment instruction is further configured to deploy the system program of the virtual PLC on the specified micro kernel, and to deploy guardian kernel on the specified micro kernel.

In the step 603, the server deploys virtual PLC(s) and soft guardian(s) according to configuration information in the initialization deployment instruction.

In the step 604, the server transmits a response of successful deployment to the client.

In the step 605, the client decides to start the virtual PLC(s) and soft guardian(s) into operation, upon reception of the response of successful deployment transmitted by each server in the server cluster, and transmits a start operation instruction to each micro kernel of each physical core on each server in the server cluster.

In the step 606, the server starts the virtual PLC(s) and the soft guardian(s) into operation.

In the embodiment of the disclosure, after the server starts the virtual PLC(s) and the soft guardian(s) into operation, the soft guardian monitors the specified virtual PLC(s) according to the specified virtual PLC(s), to be monitored by the soft guardian, in the configuration information. The soft guardian can monitor the specified virtual PLCs across the physical cores, or can monitor the specified virtual PLCs across the servers. The soft guardian transmits a heartbeat message to the each monitored specified virtual PLC, and when the specified virtual PLC is operating normally, it feeds a response to the heartbeat message to the soft guardian; and when the soft guardian has not received any response to the heartbeat message from the specified virtual PLC, then the soft guardian determines that the operating state of the specified virtual PLC is in an abnormal state, and may transmit an alarm.

In some possible embodiment, the operating state of each physical core on the server, and the operating state of each micro kernel on each physical core further include an abnormal state. When the soft guardian determines that the physical core on the server is in an abnormal state, or that the micro kernel on the physical core is in an abnormal state, then the soft guardian may transmit an alarm.

In the embodiment of the disclosure, the abnormal state can include a physical core and/or micro kernel failure, or can refer to that the current occupancy ratio of a physical core and/or a micro kernel is above a third threshold, where the third threshold is more than the first threshold, and the third threshold is also more than the second threshold. Each soft guardian transmits an alarm upon determining that a physical core and/or a micro kernel on a server in the server cluster is in an abnormal state, so that a human maintainer can be reminded of repairing the failing physical core and/or micro kernel timely, or particularly paying attention to the physical core and/or the micro kernel with the occupancy rate above the third threshold, thus improving the disaster tolerance of the entire virtual PLC system.

Figure 7:
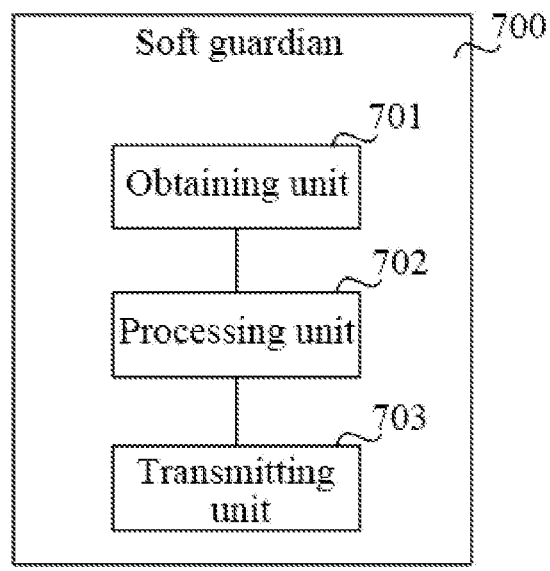
FIG. 7 is a schematic structural diagram of a soft guardian according to an embodiment of the disclosure.

Based upon the same technical idea, an embodiment of the disclosure provides a server which can perform the method according to the embodiment above of the disclosure. The server is applicable to a server cluster, each server in the server cluster includes at least one physical core on which at least two micro kernels are deployed, the server cluster includes one or more soft guardians, and the micro kernel is configured with the virtual PLC or the soft guardian. FIG. 7 illustrates a schematic structural diagram of a soft guardian according to an embodiment of the disclosure, and as illustrated in FIG. 7, the soft guardian 700 includes an obtaining unit 701, a processing unit 702, and a transmitting unit 703.

The obtaining unit 701 is configured to obtain an operating state of each physical core on each server in a server cluster, and an operating state of each micro kernel on the each physical core upon monitoring that a virtual PLC fails; the processing unit 702 is configured to determine a target micro kernel according to the operating states of the physical cores on each server, and the operating state of the each micro kernel on the each physical core; and the transmitting unit 703 is configured to transmit a reconstruction instruction to the target micro kernel, where the reconstruction instruction is configured to instruct the virtual PLC to be reconstructed on the target micro kernel.

Optionally the obtaining unit 701 is further configured to obtain configuration information, where the configuration information includes one or more specified virtual PLCs to be monitored by the soft guardian, and the specified virtual PLCs to be monitored by the soft guardian are located on the same physical core as the soft guardian, or the specified virtual PLCs to be monitored by the soft guardian are not located on the same physical core as the soft guardian; and the processing unit 702 is further configured to monitor operating states of the one or more specified virtual PLCs according to the configuration information.

Optionally the obtaining unit 701 is further configured to obtain configuration information, where the configuration information includes one or more specified virtual PLCs to be monitored by the soft guardian, and a user program compiled result file of each the specified virtual PLC; and the transmitting unit 703 is configured to transmit to the target micro kernel the reconstruction instruction including the program compiled result file of the specified virtual PLC which is monitored to fail, where the reconstruction instruction is configured to instruct the target micro kernel to reconstruct the specified virtual PLC, which is monitored to fail, according to the user program compiled result file of the specified virtual PLC.

Optionally the operating state of each physical core includes first load information of the each physical core, and the operating state of each micro kernel includes second load information of each micro kernel; the obtaining unit 701 is configured to obtain the first load information of the each physical core on each server, and the second load information of the each micro kernel on the each physical core; and the processing unit 802 is configured to determine the target micro kernel according to the first load information of the each physical core on the each server, and the second load information of the each micro kernel on the each physical core.

Figure 8:
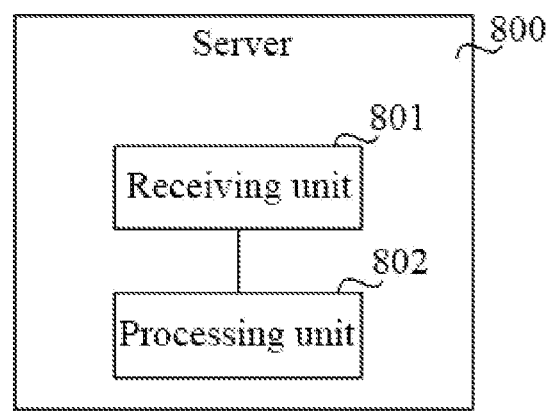
FIG. 8 is a schematic structural diagram of a server according to an embodiment of the disclosure.

Based upon the same technical idea, an embodiment of the disclosure provides a server applicable to a server cluster, each server in the server cluster includes at least one physical core on which at least two micro kernels are deployed, the server cluster includes one or more soft guardians, and the micro kernel is deployed with the virtual PLC or the soft guardian. FIG. 8 illustrates a schematic structural diagram of a server according to an embodiment of the disclosure, and as illustrated in FIG. 8, the server 800 includes a receiving unit 801 and a processing unit 802.

The receiving unit 801 is configured to receive a reconstruction instruction from the soft guardian, where the reconstruction instruction includes a user program compiled result file of a specified virtual PLC monitored by the soft guardian, and a target micro kernel on which the specified virtual PLC is to be reconstructed; and the processing unit 902 is configured to reconstruct the specified virtual PLC on the target micro kernel according to the user program compiled result file of the specified virtual PLC.

Optionally the processing unit 802 is configured to start system program of the virtual PLC preinstalled on the target micro kernel, and to execute the user program compiled result file of the specified virtual PLC on the system program of the virtual PLC.

Optionally the receiving unit 801 is further configured to receive an initialization deployment instruction from a client, where the configuration information in the initialization deployment instruction is configured to deploy a soft guardian on a specified micro kernel on a specified physical core, and to deploy a virtual PLC on a specified micro kernel on a specified physical core, and to make the soft guardian monitor one or more specified virtual PLC, wherein the specified virtual PLCs monitored by the soft guardian are located on the same physical core as the soft guardian, or the specified PLCs monitored by the soft guardian are not located on the same physical core as the soft guardian; and the processing unit 802 is further configured to deploy the virtual PLC and the soft guardian according to configuration information in the initialization deployment instruction.

A part or all of each of the embodiments above can be implemented in software, hardware, firmware, or any combination thereof, and when the embodiment is implemented in software program, a part or all of the embodiments can be embodied as a computer program product. The computer program product includes one or more instructions. When the computer program instruction(s) is or are loaded and executed on a computer, a part or all of the flow or the functions according to the embodiment of the disclosure. The computer can be a general-purpose computer, a dedicated computer, a computer network, or another programmable device. The instruction(s) can be stored on a computer storage medium, or transmitted from a computer storage medium to another computer storage medium, and for example, the instruction(s) can be transmitted from a web site, a computer, a server, or a data center to another web site, a computer, a server, or a data center over a wire (e.g., a coaxial cable, an optic fiber, a Digital Subscriber Line (DSL), etc.), or wirelessly (e.g., infrared, radio, microwaves, etc.). The computer storage medium can be any computer accessible available medium, or can be a server, a data center, or another data storage device integrated with one or more available mediums. The available medium(s) can be a magnetic medium (e.g., a floppy disk, a hard disk, a magnetic tape, a Magnetic-Optical (MO) disk, etc.), an optical medium (e.g., a CD, a DVD, a BD, an HVD, etc.), a semiconductor medium (e.g., an ROM, an EPROM, an EEPROM, a nonvolatile memory (NAND FLASH), a Solid State Disk (SSD), etc.), etc.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for monitoring and reconstructing a software-defined Programmable Logic Controller (PLC), wherein the method is applicable to a server cluster, each of a plurality of servers in the server cluster comprises at least one physical core on which at least two micro kernels are deployed, the micro kernels on the at least one physical core comprises a first group of the micro kernel on which a virtual PLC is deployed, a second group of the micro kernel on which a soft guardian is deployed, and a third group of the micro kernel without the virtual PLC and the soft guardian deployed thereon; and the method comprises:

upon monitoring that the virtual PLC fails, obtaining, by the soft guardian, an operating state of each physical core on each server in the server cluster, and an operating state of each micro kernel on the each physical core;

determining, by the soft guardian, a target micro kernel according to the operating state of the each physical core on the each server, and the operating state of the each micro kernel on the each physical core; and transmitting, by the soft guardian, a reconstruction instruction to the target micro kernel, wherein the reconstruction instruction comprises a user program compiled result file of a specified virtual PLC monitored by the soft guardian and the target micro kernel on which the specified virtual PLC is to be reconstructed, and the reconstruction instruction is configured to instruct the virtual PLC to be reconstructed on the target micro kernel.

2. The method according to claim 1, wherein before the soft guardian monitors that the virtual PLC fails, the method further comprises:

obtaining, by the soft guardian, configuration information, wherein the configuration information comprises one or more specified virtual PLCs to be monitored by the soft guardian, and the specified virtual PLCs to be monitored by the soft guardian are located on a same physical core as the soft guardian, or the specified virtual PLCs to be monitored by the soft guardian are not located on the same physical core as the soft daemon; and monitoring, by the soft guardian, operating states of the one or more specified virtual PLCs according to the configuration information.

3. The method according to claim 1, wherein before the soft guardian monitors that the virtual PLC fails, the method further comprises:

obtaining, by the soft guardian, configuration information, wherein the configuration information comprises one or more specified virtual PLCs to be monitored by the soft guardian, and a user program compiled result file of each of the one or more specified virtual PLCs; and transmitting, by the soft guardian, the reconstruction instruction to the target micro kernel comprises:

transmitting, by the soft guardian, to the target micro kernel the reconstruction instruction comprising the program compiled result file of the specified virtual PLC which is monitored to fail, wherein the reconstruction instruction is configured to instruct the target micro kernel to reconstruct the specified virtual PLC, which is monitored to fail, according to the user program compiled result file of the specified virtual PLC.

4. The method according to claim 1, wherein the operating state of the each physical core comprises first load information of the each physical core, and the operating state of the each micro kernel comprises second load information of the each micro kernel;

obtaining, by the soft guardian, the operating state of each physical core on each of server in the server cluster, and the operating state of each micro kernel on each physical core comprises:
obtaining, by the soft guardian, the first load information of the each physical core on the each server, and the second load information of the each micro kernel on the each physical core; and
determining, by the soft guardian, the target micro kernel according to the operating state of the each physical core on the each server, and the operating state of the each micro kernel on the each physical core comprises:
determining, by the soft guardian, the target micro kernel according to the first load information of the each physical core on the each server, and the second load information of the each micro kernel on the each physical core.

5. A method for monitoring and reconstructing a software-defined PLC, wherein the method is applicable to a server cluster, each of a plurality of servers in the server cluster comprises at least one physical core on which at least two micro kernels are deployed, the micro kernels on the at least one physical core comprises a first group of the micro kernel on which a virtual PLC is deployed, a second group of the micro kernel on which a soft guardian is deployed, and a third group of the micro kernel without the virtual PLC and the soft guardian deployed thereon; and the method comprises:
receiving, by a server, a reconstruction instruction from the soft guardian, wherein the reconstruction instruction comprises a user program compiled result file of a specified virtual PLC monitored by the soft guardian, and a target micro kernel on which the specified virtual PLC is to be reconstructed; and
reconstructing, by the server, the specified virtual PLC on the target micro kernel according to the user program compiled result file of the specified virtual PLC.

6. The method according to claim 5, wherein reconstructing, by the server, the specified virtual PLC on the target micro kernel according to the reconstruction instruction, and the user program compiled result file of the specified virtual PLC comprises:
starting, by the server, system program of the virtual PLC preinstalled on the target micro kernel, and executing the user program compiled result file of the specified virtual PLC on the system program of the virtual PLC.

7. The method according to claim 5, wherein before the server receives the reconstruction instruction from the soft guardian, the method further comprises:
receiving, by the server, an initialization deployment instruction from a client, wherein configuration information in the initialization deployment instruction is configured to deploy a soft guardian on a specified micro kernel on a specified physical core, and to deploy a virtual PLC on a specified micro kernel on a specified physical core, and to make the soft guardian monitor one or more specified virtual PLCs, wherein the specified virtual PLCs monitored by the soft guardian are located on a same physical core as the soft guardian, or the specified PLCs monitored by the soft guardian are not located on the same physical core as the soft guardian; and
deploying, by the server, the virtual PLC and the soft guardian according to the configuration information in the initialization deployment instruction.

8. A server for monitoring and reconstructing a software-defined PLC, wherein the server is applicable to a server cluster, each of a plurality of servers in the server cluster comprise at least one physical core on which at least two micro kernels are deployed, the micro kernels on the at least one physical core comprises a first group of the micro kernel on which a virtual PLC is deployed, a second group of the micro kernel on which a soft guardian is deployed, and a third group of the micro kernel without the virtual PLC and the soft guardian deployed thereon; and the soft guardian deployed on the server comprises:
a memory configured to store program instructions; and
a processor configured to invoke the program instructions stored in the memory to obtain an operating state of each physical core on each server in the server cluster, and an operating state of each micro kernel on the each physical core;
to determine a target micro kernel according to the operating state of the each physical core on the each server, and the operating state of the each micro kernel on the each physical core; and
to transmit a reconstruction instruction to the target micro kernel, wherein the reconstruction instruction comprises a user program compiled result file of a specified virtual PLC monitored by the soft guardian and the target micro kernel on which the specified virtual PLC is to be reconstructed, and the reconstruction instruction is configured to instruct the virtual PLC to be reconstructed on the target micro kernel.

9. The server according to claim 8, wherein the processor is further configured:
to obtain configuration information, wherein the configuration information comprises one or more specified virtual PLCs to be monitored by the soft guardian, and the specified virtual PLCs to be monitored by the soft guardian are located on a same physical core as the soft guardian, or the specified virtual PLCs to be monitored by the soft guardians are not located on the same physical core as the soft guardian; and
to monitor operating states of the one or more specified virtual PLCs according to the configuration information.

10. The server according to claim 8, wherein the processor is further configured:
to obtain configuration information, wherein the configuration information comprises one or more specified virtual PLCs to be monitored by the soft guardian, and a user program compiled result file of each of the one or more the specified virtual PLCs; and
to transmit to the target micro kernel the reconstruction instruction comprising the program compiled result file of the specified virtual PLC which is monitored to fail, wherein the reconstruction instruction is configured to instruct the target micro kernel to reconstruct the specified virtual PLC, which is monitored to fail, according to the user program compiled result file of the specified virtual PLC.

11. The server according to claim 8, wherein the operating state of the each physical core comprises first load information of the each physical core, and the operating state of the each micro kernel comprises second load information of the each micro kernel;
the processor is configured:
to obtain the first load information of the each physical core on the each server, and the second load information of the each micro kernel on the each physical core; and
to determine the target micro kernel according to the first load information of the each physical core on the each server, and the second load information of the each micro kernel on the each physical core.

12. A non-transitory computer readable storage medium on which computer executable instructions are stored, wherein the computer executable instructions are configured to be executed on a computer to cause the computer to perform the method according to claim 1.

13. The non-transitory computer readable storage medium according to claim 12, wherein before the soft guardian monitors that the virtual PLC fails, the method further comprises:
   obtaining, by the soft guardian, configuration information, wherein the configuration information comprises one or more specified virtual PLCs to be monitored by the soft guardian, and the specified virtual PLCs to be monitored by the soft guardian are located on a same physical core as the soft guardian, or the specified virtual PLCs to be monitored by the soft guardian are not located on the same physical core as the soft daemon; and
   monitoring, by the soft guardian, operating states of the one or more specified virtual PLCs according to the configuration information.

14. The non-transitory computer readable storage medium according to claim 12, wherein before the soft guardian monitors that the virtual PLC fails, the method further comprises:
   obtaining, by the soft guardian, configuration information, wherein the configuration information comprises one or more specified virtual PLCs to be monitored by the soft guardian, and a user program compiled result file of each of the one or more specified virtual PLCs; and
   transmitting, by the soft guardian, the reconstruction instruction to the target micro kernel comprises:
   transmitting, by the soft guardian, to the target micro kernel the reconstruction instruction comprising the program compiled result file of the specified virtual PLC which is monitored to fail, wherein the reconstruction instruction is configured to instruct the target micro kernel to reconstruct the specified virtual PLC, which is monitored to fail, according to the user program compiled result file of the specified virtual PLC.

15. The non-transitory computer readable storage medium according to claim 12, wherein the operating state of the each physical core comprises first load information of the each physical core, and the operating state of the each micro kernel comprises second load information of the each micro kernel;
   obtaining, by the soft guardian, the operating state of each physical core on each of server in the server cluster, and the operating state of each micro kernel on each physical core comprises:
   obtaining, by the soft guardian, the first load information of the each physical core on the each server, and the second load information of the each micro kernel on the each physical core; and
   determining, by the soft guardian, the target micro kernel according to the operating state of the each physical core on the each server, and the operating state of the each micro kernel on the each physical core comprises:
   determining, by the soft guardian, the target micro kernel according to the first load information of the each physical core on the each server, and the second load information of the each micro kernel on the each physical core.

16. A non-transitory computer readable storage medium on which computer executable instructions are stored, wherein the computer executable instructions are configured to executed on a computer to cause the computer to perform the method according to claim 5.

17. The non-transitory computer readable storage medium according to claim 16, wherein reconstructing, by the server, the specified virtual PLC on the target micro kernel according to the reconstruction instruction, and the user program compiled result file of the specified virtual PLC comprises:
   starting, by the server, system program of the virtual PLC preinstalled on the target micro kernel, and executing the user program compiled result file of the specified virtual PLC on the system program of the virtual PLC.

18. The non-transitory computer readable storage medium according to claim 16, wherein before the server receives the reconstruction instruction from the soft guardian, the method further comprises:
   receiving, by the server, an initialization deployment instruction from a client, wherein configuration information in the initialization deployment instruction is configured to deploy a soft guardian on a specified micro kernel on a specified physical core, and to deploy a virtual PLC on a specified micro kernel on a specified physical core, and to make the soft guardian monitor one or more specified virtual PLCs, wherein the specified virtual PLCs monitored by the soft guardian are located on a same physical core as the soft guardian, or the specified PLCs monitored by the soft guardian are not located on the same physical core as the soft guardian; and
   deploying, by the server, the virtual PLC and the soft guardian according to the configuration information in the initialization deployment instruction.

\* \* \* \* \*